US008441693B2

(12) United States Patent
Aritomi

(10) Patent No.: US 8,441,693 B2
(45) Date of Patent: May 14, 2013

(54) INFORMATION PROCESSING APPARATUS, METHOD, AND PROGRAM FOR SELECTING DYNAMIC INFORMATION WITH HIGH PRIORITY FOR LATENT IMAGE PRINTING

(75) Inventor: Masanori Aritomi, Tokyo (JP)

(73) Assignee: Canon Kabushiki Kaisha (JP)

( * ) Notice: Subject to any disclaimer, the term of this patent is extended or adjusted under 35 U.S.C. 154(b) by 1081 days.

(21) Appl. No.: 12/056,799

(22) Filed: Mar. 27, 2008

(65) Prior Publication Data

US 2008/0240815 A1 Oct. 2, 2008

(30) Foreign Application Priority Data

Apr. 2, 2007 (JP) ................................ 2007-096597

(51) Int. Cl.
*H04N 1/40* (2006.01)
*G06K 15/00* (2006.01)
*G06F 3/12* (2006.01)
*G03G 21/00* (2006.01)

(52) U.S. Cl.
USPC ......... 358/3.28; 358/1.14; 358/1.15; 399/366

(58) Field of Classification Search ........................ None
See application file for complete search history.

(56) References Cited

U.S. PATENT DOCUMENTS

| | | | | |
|---|---|---|---|---|
| 6,362,892 | B1 * | 3/2002 | Lee et al. | 358/1.13 |
| 6,389,151 | B1 * | 5/2002 | Carr et al. | 382/100 |
| 2005/0058476 | A1 * | 3/2005 | Murakami | 399/366 |
| 2005/0108408 | A1 * | 5/2005 | Ookubo | 709/228 |
| 2006/0067759 | A1 * | 3/2006 | Osaka | 399/366 |
| 2007/0008569 | A1 | 1/2007 | Shimazawa | |
| 2007/0143603 | A1 * | 6/2007 | Hadden et al. | 713/167 |

FOREIGN PATENT DOCUMENTS

| | | | |
|---|---|---|---|
| CN | 1892471 | A | 1/2007 |
| JP | 2001-197297 | A | 7/2001 |

OTHER PUBLICATIONS

Notification of First Office Action issued in corresponding Chinese Patent Application No. 2008100906256 dated Sep. 25, 2009.

* cited by examiner

*Primary Examiner* — Fan Zhang

(74) *Attorney, Agent, or Firm* — Rossi, Kimms & McDowell LLP

(57) ABSTRACT

An information processing apparatus that generates print data sent to a printing device acquires variable information from a plurality of devices, the variable information being finalized when the printing device carries out printing. The apparatus selects variable information from the plural pieces of variable information acquired from the plurality of devices in accordance with its own operation environment and operating location. The apparatus then adds the selected variable information to the print data and outputs the resultant.

9 Claims, 26 Drawing Sheets

INFORMATION PROCESSING APPARATUS, METHOD, AND PROGRAM FOR SELECTING DYNAMIC INFORMATION WITH HIGH PRIORITY FOR LATENT IMAGE PRINTING

BACKGROUND OF THE INVENTION

1. Field of the Invention

The present invention relates to a technique for generating and printing an image including a copy-forgery-inhibited pattern image that deters the use of duplicates and the like.

2. Description of the Related Art

Content such as official forms, certificates of residence, and so on are conventionally printed onto paper that has undergone a special printing process, known as anti-counterfeit paper, for the purpose of prohibiting or suppressing the duplication of such content. With such anti-counterfeit paper, characters reading "copying prohibited" or the like, which are nearly unrecognizable to humans in the original form, appear when the form is duplicated using a copy machine or the like. This has the effect of making the person who duplicated the form hesitant to use that duplicate. Furthermore, the fact that content such as official forms is printed on anti-counterfeit paper alone has the effect of suppressing/deterring duplication itself.

However, such anti-counterfeit paper is problematic in that it has a higher cast than normal paper. This anti-counterfeit paper furthermore is limited in its applications, as only the characters that were set when the anti-counterfeit paper was first manufactured can appear as a result of duplication. Thus, such anti-counterfeit paper lacks flexibility in terms of applications.

Meanwhile, at present, various types of content are being digitized, and the above-mentioned content such as official forms, certificates of residence, and so on are being digitized in a similar manner. Nevertheless, the digitization of such official forms, certificates of residence, and so on is still in a transitional period, and using a printer or the like to output content created using a computer onto paper and using the content is still common.

In response to this situation, a technique has been proposed in which anti-counterfeit paper conventionally created in advance through printing plates is instead generated using a computer and a printer (for example, Japanese Patent Laid-Open No. 2001-197297). This technique generates image data known as a "copy-forgery-inhibited pattern" in addition to the data of the content, superimposes the one data on the other, and outputs the resultant, when printing/outputting content created using a computer. This copy-forgery-inhibited pattern is also sometimes called a copy-deterrent design. Although the copy-forgery-inhibited pattern image looks like nothing more than a simple pattern or background image to the human eye in the original document (the printed material outputted by a printer), predetermined characters or images are visualized when the document is duplicated. Therefore, this original document can provide deterrent effects similar to those of the anti-counterfeit paper mentioned above. This has been made possible by dramatic increases in printer performance.

It goes without saying that normal printing paper can be used for output when superimposing a copy-forgery-inhibited pattern image created using a computer onto content data and outputting the resultant. Such a system is therefore advantageous in terms of cost as compared to using anti-counterfeit paper created in advance. Furthermore, the copy-forgery-inhibited pattern image can be generated when printing/outputting content data, and thus the color of the copy-forgery-inhibited pattern image, as well as the characters or the like that are to be visualized when the original document is duplicated, can be set with freedom. There is a further advantage in that the output time, information unique to the printing device, and so on can be used in the copy-forgery-inhibited pattern image.

As described above, such a copy-forgery-inhibited pattern image achieves the effect of suppressing the use of duplicates, as predetermined characters or the like that could not be recognized prior to duplication appear when the original document is duplicated. In order to achieve this effect, the generated copy-forgery-inhibited pattern image is fundamentally configured of two regions: a region where the same image present in the original document remains in the duplicate; and a region where the image present in the original document disappears in the duplicate or appears lighter compared to the stated remaining image. With such a copy-forgery-inhibited pattern image configured of two regions, it is preferable for the stated two regions to have approximately the same density when printed and outputted.

In other words, it is necessary for the printed/outputted copy-forgery-inhibited pattern image to be composed so that the characters that are visualized in the duplicate are hidden and difficult to recognize visually by a human on a macro scale. Such an image region, which is hidden in the printed output that includes the copy-forgery-inhibited pattern image that appears, visually recognizable to humans, in a duplicate resulting from that printed output being duplicated, is called a "latent image". Furthermore, an image region that disappears in the duplicate or is less dark compared to the latent image visualized in the duplicate is called a "background" (or a "background image"), for the sake of convenience. The copy-forgery-inhibited pattern image is, basically speaking, made up of the latent image and the background image. Note that there are also cases where the latent image is called a "foreground" when discussing user interfaces.

The latent image is composed of a concentration of dots within a predetermined region. As opposed to this, the background part is composed of dots dispersed throughout a predetermined region. It is possible to make it difficult to distinguish between the latent image part and the background part in the printed output including the copy-forgery-inhibited pattern image by making the density of the dots approximately the same within these regions.

FIG. 10 is a diagram illustrating the state of the dots in the two image regions, or the latent image part and the background part. As illustrated in FIG. 10, a copy-forgery-inhibited pattern image is composed of a background part in which dots are dispersed throughout a predetermined region and a latent image part in which dots are concentrated within a predetermined region. The dots within these two regions can be generated through halftone processes, dithering processes, and the like that differ from one another. For example, when generating a copy-forgery-inhibited pattern image using halftone processing, a halftone process that utilizes low lines per inch in the latent image part is carried out. Meanwhile, it is preferable to carry out a halftone process that applies high lines per inch to the background part.

Furthermore, when generating a copy-forgery-inhibited pattern image using a dithering process, it is preferable to carry out a dithering process using a dot-concentrated dithering matrix on the latent image part, and carry out a dithering process using a dot-dispersed dithering matrix on the background part.

There is generally a limit level on the reproduction capabilities of the scanning and image forming units of a copy machine. This limit level depends on the input resolution at which minute dots in an original document are scanned and the output resolution at which those minute dots are reproduced. When the dots in the background part of the copy-forgery-inhibited pattern image are formed so as to be smaller than the limit level at which a copy machine can reproduce those dots, and the dots in the latent image part of the copy-forgery-inhibited pattern image are formed so as to be larger than the stated limit level, the dots of the latent image part are reproduced in the duplicate, whereas the small dots of the background part are not reproduced. Using this characteristic makes the latent image appear in a duplicate in which the copy-forgery-inhibited pattern image has been duplicated. An image appearing in the duplicate shall be referred to as 'visualization' hereinafter. Note that even if the background part has been reproduced through the duplication, similar effects can be achieved as in the case where the dots are not reproduced, as long as the latent image part is a level that can be obviously recognized level in the duplicate.

FIGS. 11A and 11B are diagrams illustrating an image that has been visualized in a duplicate, and conceptually illustrates visualization in the duplicate where the dots have been concentrated, and a lack of reproduction in the duplicate where the dots have been dispersed.

It should be noted that copy-forgery-inhibited pattern printing is not limited to the stated configuration; any configuration may be used as long as the character string or the like is reproduced at a recognizable level in the duplicate. In other words, copy-forgery-inhibited pattern printing in which the character string or the like is set to be the background part and thus appears as knockout characters when duplicated also achieves the same effect.

There is another advantage in that the output time, information unique to the printing device, and so on can be used as the copy-forgery-inhibited pattern image. In particular, there are situations where a character string image visualizing the computer name is used, as information unique to the device that generated the print job. This computer name is then used to identify the printing conditions.

However, the following problems arise due to fluctuations in the printing condition information (particularly, information for identifying items), and the computing environment.

Information such as usernames, computer names, and so on set to be the visualized image in the copy-forgery-inhibited pattern is called "variable information". The word "variable" is used here because even if a "username", "date and time", or the like is set using an operational section, finalization of the details of the character string occurs when the copy-forgery-inhibited pattern is generated. Thus the username, print time, and the like from when the printing occurs become the finalized character string. On the other hand, "custom" represents information that not variable, and the content of the character string is finalized when the character string is inputted using the operational section.

A user specifies variable information such as a "username", "computer name", or the like; that information becomes the latent image character string in the copy-forgery-inhibited pattern, and is used to identify the printing conditions. The finalization of the details occurs when the copy-forgery-inhibited pattern is generated. Thus far, the "username", "computer name", and the like have been acquired by a single computer with which the printing is executed and the copy-forgery-inhibited pattern is generated, and thus there have been no problems (see FIG. 13). In other words, information such as the "username" and "computer name" has been paired with a single person or item.

However, user environments have become diverse, and the need for server-integrated computing, as exemplified by the Metaframe scheme, has arisen. In such a server-integrated computing environment, a user logs on to a server via a terminal and uses that server and its resources. An example of the procedure through which a user uses the server/resources shall be provided hereinafter.

The user starts up his/her own client computer (terminal), or in other words, logs on to the terminal and launches the terminal software. The user then logs on to the integrated server via the terminal, and uses server processes. In this example, the user is logging on twice, accessing two computers, and the processing is being performed by the server (see FIG. 14).

In this server-integrated environment, the "username", "computer name", and the like are acquired. As described above, this processing is performed on the server side. The acquired "username" is the name used to log on to the server, and thus the identifiability can be maintained; however, the "computer name" is the server name, and thus is information that has low identifiability.

In other words, in such an environment, information such as the "username" and "computer name" is not paired with a single person or item. In order to maintain the identifiability of the "computer name" in such an integrated environment, it is necessary to reflect the computer names of terminals not carrying out printing processing in the printing process performed by the server.

Moreover, IP addresses, MAC addresses, and so on, which are pieces of variable information carrying similar meanings as the stated "computer name", have identifiability problems in such an integrated environment. However, the situation is not such that identifiability is lacking in all types of variable information. Even in such an integrated environment, a "job name" is not problematic in terms of identifiability as it indicates the same spool file.

Variable information and extensions for control thereof is thus desirable when considering such server integration and future virtual server environments. Processing for cases where an item is not paired with a single piece of information is also necessary. Accordingly, when taking the usability for the user into consideration, it is desirable for the program that carries out such processing to automatically select processes in accordance with the environment in which the system is present. Of course, manual settings should also be possible.

SUMMARY OF THE INVENTION

It is an object of the present invention to make it possible to identify printing conditions even when the usage environment changes, and to improve the compatibility with future environments and the operability.

According to one aspect of the present invention, there is provided an information processing apparatus comprising: an acquisition unit that acquires variable information from another apparatus; and a generation unit that generates print data for printing the variable information acquired by the acquisition unit as a latent image character string in a copy-forgery-inhibited pattern.

According to another aspect of the present invention, there is provided an information processing method executed by an information processing apparatus, the method comprising: acquiring variable information from another apparatus; and generating print data for printing the variable information acquired in the acquiring step as a latent image character string in a copy-forgery-inhibited pattern.

Further features of the present invention will become apparent from the following description of exemplary embodiments with reference to the attached drawings.

DESCRIPTION OF THE EMBODIMENTS

Preferred embodiments for carrying out the present invention shall be described in detail hereinafter with reference to the drawings.

Note that in the embodiments, a region visualized in a duplicate resulting from printed output having a copy-forgery-inhibited pattern image being duplicated is called a "latent image part" or a "foreground part". Furthermore, a region disappearing in the duplicate or appearing with a reduced density as compared to the latent image part in the duplicate is called a "background part". The descriptions given hereinafter assume that text, an image, or the like is specified as the copy-forgery-inhibited pattern image, and that the text, image, or the like of the latent image part that is visualized in the duplicate is reproduced at a greater density than the background part so as to be recognizable.

However, the copy-forgery-inhibited pattern image according to the present invention is not intended to be limited thereto. For example, the text, image, or the like may be set as the background part, and the regions surrounding the background part may be set as the latent image part, resulting in the text, image, or the like being expressed as knockout characters/a knockout image in the duplicate.

Furthermore, the present invention is not intended to be defined by the type of the copy-forgery-inhibited pattern image, or by the generation process, color, shape, size, or the like thereof.

Hereinafter, descriptions shall be given regarding printing processing and the generation of basic drawing data of the copy-forgery-inhibited pattern image that accompanies that printing processing, in a system configured of an information processing device (a computer) and a printing device (a printer) according to the present invention. Note that although the following descriptions discuss a copy-forgery-inhibited pattern image in the context of a system made up of a computer and a printer, the present invention is not intended to be limited to such a configuration.

(Printing System Configuration)

Figure 1:
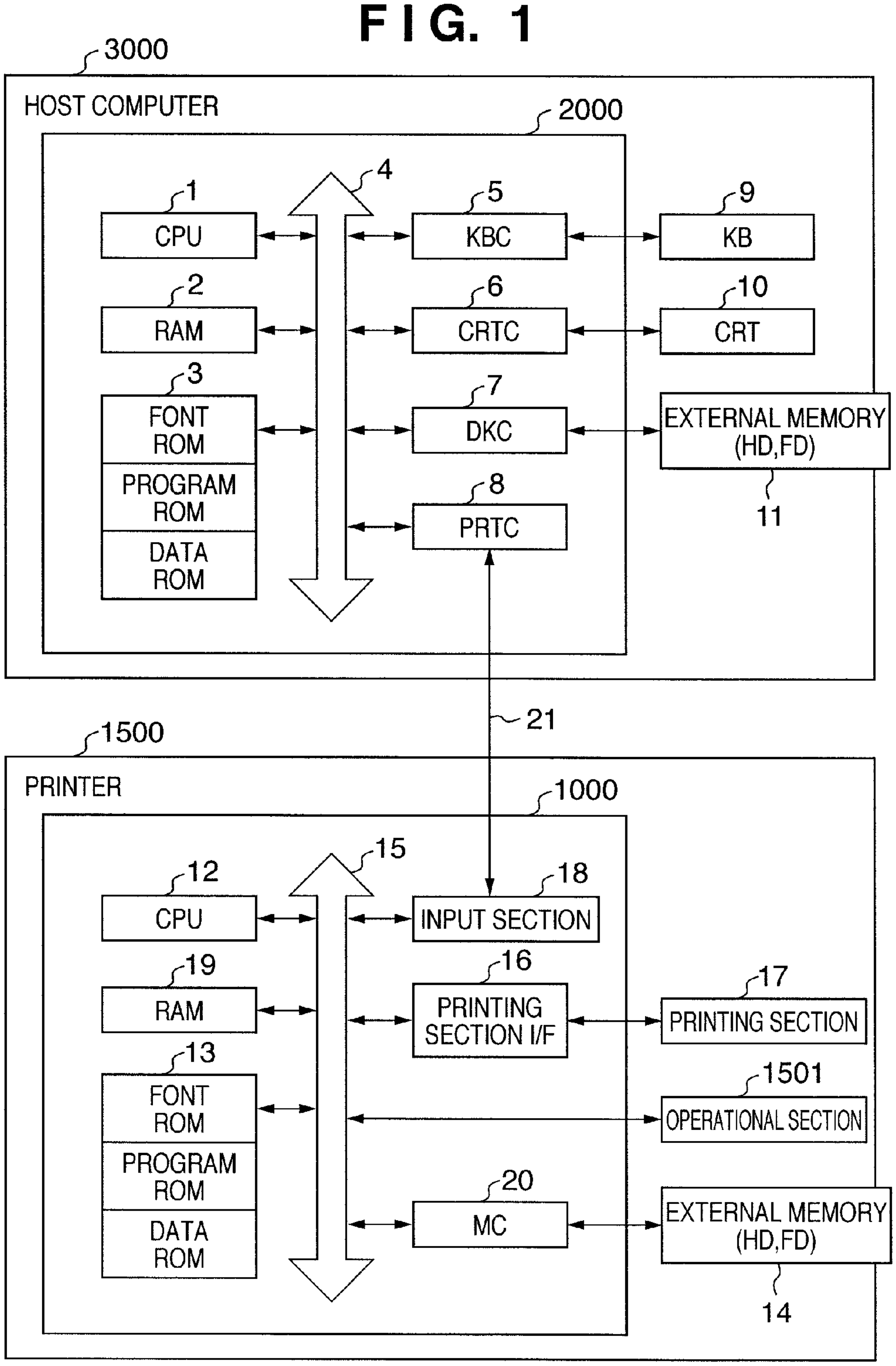
FIG. 1 is a block diagram illustrating an example of a configuration of a printing system according to an embodiment of the present invention.

FIG. 1 is a block diagram illustrating an example of a configuration of a printing system according to the present embodiment. As shown in FIG. 1, the printing system is configured of a host computer 3000 and a printer 1500. Note that as long as the functionality of the present invention is realized, the present invention can be applied to a single device, a system made up of a plurality of devices, a system connected via a network such as a LAN or WAN and that carries out processing, and so on.

The host computer 3000 illustrated in FIG. 1 includes a CPU 1 that executes processing for documents in which diagrams, images, characters, tables (including spreadsheets) coexist, based on a document processing program or the like stored within a program ROM within a ROM 3 or an external memory (HD, FD, or the like) 11. The CPU 1 performs overall control of devices connected to a system bus 4.

An operating system ("OS" hereinafter), which is a control program of the CPU 1, is stored in the program ROM within the ROM 3, the external memory 11, or the like. Furthermore, font data and the like used when performing document processing is stored in a font ROM within the ROM 3, the external memory 11, or the like, and various types of data used when performing document processing is stored in a data ROM within the ROM 3, the external memory 11, or the like. A boot program, various applications, font data, user files, editing files, printer control command generation programs ("printer driver" hereinafter), and the like are stored in the external memory 11. A RAM 2 functions as the main memory, working area, and the like of the CPU 1.

Furthermore, in the host computer 3000, the numeral 5 represents a keyboard controller (KBC), which controls input from a keyboard 9, a pointing device (not shown), and the like. 6 represents a CRT controller (CRTC), which controls what is displayed in a CRT display (CRT) 10. 7 represents a disk controller (DKC), controlling access to the external memory 11, which is a hard disk (HD), flexible disk (FD), or the like. 8 represents a printer controller (PRTC), executing control processing for communication with the printer 1500, which is connected to the host computer 3000 via a two-way interface 21.

Note that WYSIWYG can be implemented in the CRT 10 by the CPU 1 executing, for example, processing for loading (rasterizing) an outline font in a display information region set within the RAM 2. The CPU 1 also opens various registered windows in the CRT 10 based on commands specified using a mouse cursor or the like (not shown), and executes various data processes. Through this, when a user executes printing, a window for printing settings is opened, and printer settings, print processing method settings for the printer driver including print mode selection, and the like can be carried out therethrough.

Meanwhile, in the printer 1500, the numeral 12 represents a printer CPU, which outputs an image signal to a printing section (printer engine) 17 via a printing section I/F 16, based on a control program stored in a program ROM within a ROM 13, a control program stored in an external memory 14, or the like.

A control program of the CPU 12 is stored in the program ROM within the ROM 13. Font data and the like used when generating output information is stored in a font ROM within the ROM 13. Information used by the host computer and so on is stored in a data ROM within the ROM 13 in the case where the external memory 14, such as a hard disk, is not included in the printer.

The CPU 12 is capable of carrying out communication processing with the host computer 3000 via an input unit 18, and can communicate information and the like from within the printer 1500 to the host computer 3000. A RAM 19 is a RAM that functions as the main memory, working area, and the like of the CPU 12, and is configured so as to be capable of expanding the memory capacity through an optional RAM that is connected to an expansion port (not shown). Note that the RAM 19 is used as an output information loading region, an environmental data storage region, an NVRAM, and so on.

Access to the abovementioned external memory 14, which is a hard disk (HD), an IC card, or the like, is controlled by a memory controller (MC) 20. Font data, emulation programs, form data, and the like are stored in the external memory 14, which is optionally connected. An operational section 1501 is configured of switches for operations, LEDs, an LCD, and so on. The printer 1500 may furthermore include an NVRAM (not shown) and store printer mode setting information from the operational section 1501.

In the present embodiment, an electrophotographic engine is used as the printing section 17. Accordingly, print data including a copy-forgery-inhibited pattern image is ultimately recorded onto a medium such as paper using dots of toner. Of course, it should be noted that the printing scheme of the present invention is not intended to be limited to this type of electrophotographic method. For example, the present invention can also be applied to a printing system using any system that carries out printing by forming dots, such as an inkjet method.

Figure 2:
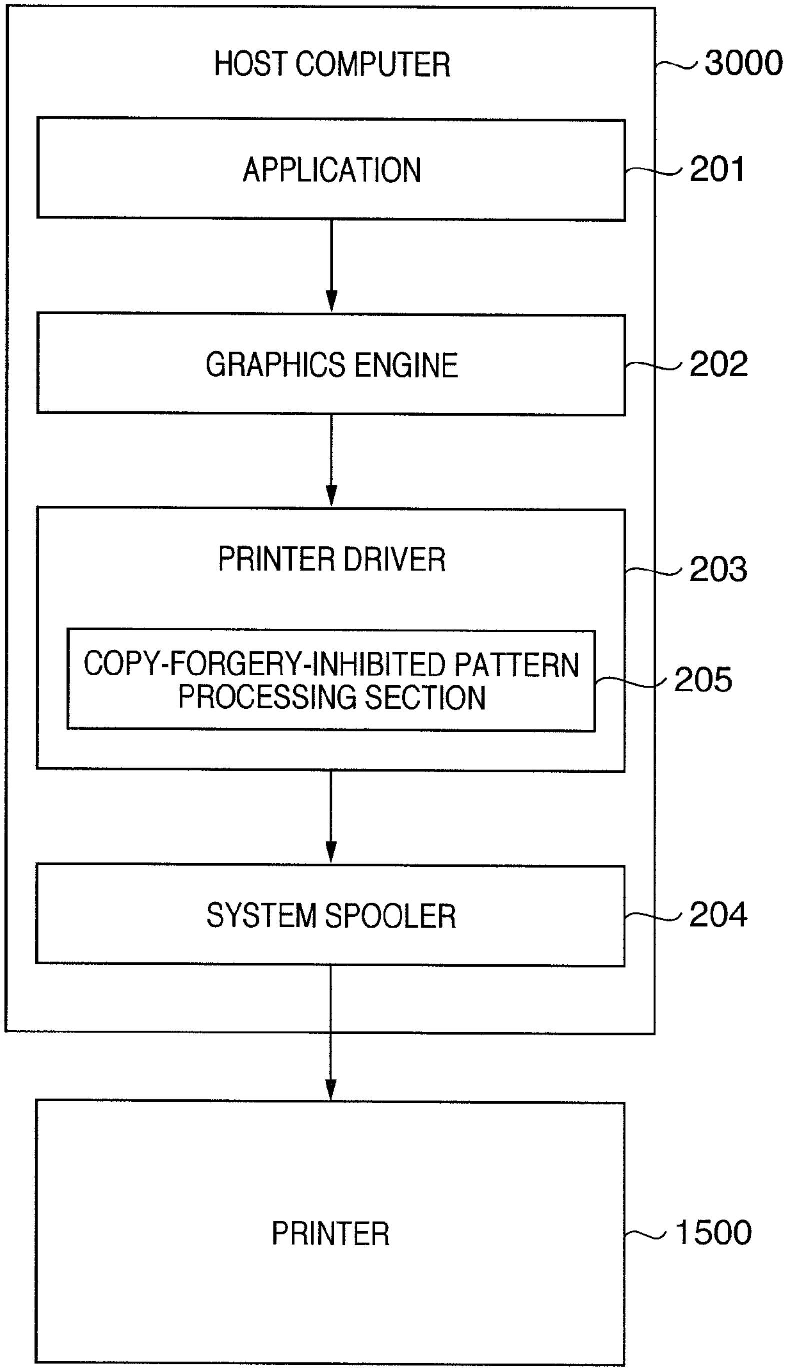
FIG. 2 is a diagram illustrating the configuration of a software module that carries out printing processing in a host computer 3000.

Next, the configuration of a software module that carries out printing processing in a host computer 3000 to which the printer 1500 is connected, and the processing performed thereby, shall be described using FIG. 2.

FIG. 2 is a diagram illustrating the configuration of the software module that carries out printing processing in the host computer 3000. In FIG. 2, an application 201, a graphics engine 202, printer driver 203, and a system spooler 204 exist as files stored in the external memory 11. Each module is loaded into the RAM 2 by the OS and executed when that module is to be used.

Furthermore, the application 201 and the printer driver 203 can be added to the HD of the external memory 11 via an FD of the external memory 11, a CD-ROM (not shown), or a network (also not shown).

The application 201 that is stored in the external memory 11 is loaded into the RAM 2 and executed. However, when printing is to be carried out in the printer 1500 using the application 201, the graphics engine 202, which is an executable, is loaded into the RAM 2 in the same manner and used to carry out output (drawing).

The graphics engine 202 loads the printer driver 203, which is prepared for each printing device such as a printer, from the external memory 11 into the RAM 2, and sets the output of the application 201 in the printer driver 203. The graphics engine 202 also converts a GDI (Graphics Device Interface) function received from the application 201 into a DDI (Device Driver Interface) function and outputs the resultant to the printer driver 203.

The printer driver 203 converts the DDI function received from the graphics engine 202 into control commands recognizable by the printer, such as, for example, PDL (Page Description Language). The converted printer control commands pass through the system spooler 204 loaded into the RAM 2 by the OS and are outputted to the printer 1500 via the interface 21 as print data.

The printing system according to the present embodiment includes a copy-forgery-inhibited pattern processing section 205 within the printer driver 203. The copy-forgery-inhibited pattern processing section 205 may be a built-in module within the printer driver 203, or may be in library module form, added through an individual installation. Regarding printing of the copy-forgery-inhibited pattern image, the printer driver 203 carries out processing such as drawing of the copy-forgery-inhibited pattern image, which shall be described later, by executing the copy-forgery-inhibited pattern processing section 205.

(Description of Copy-Forgery-Inhibited Pattern Image Printing Processing)

Figure 3:
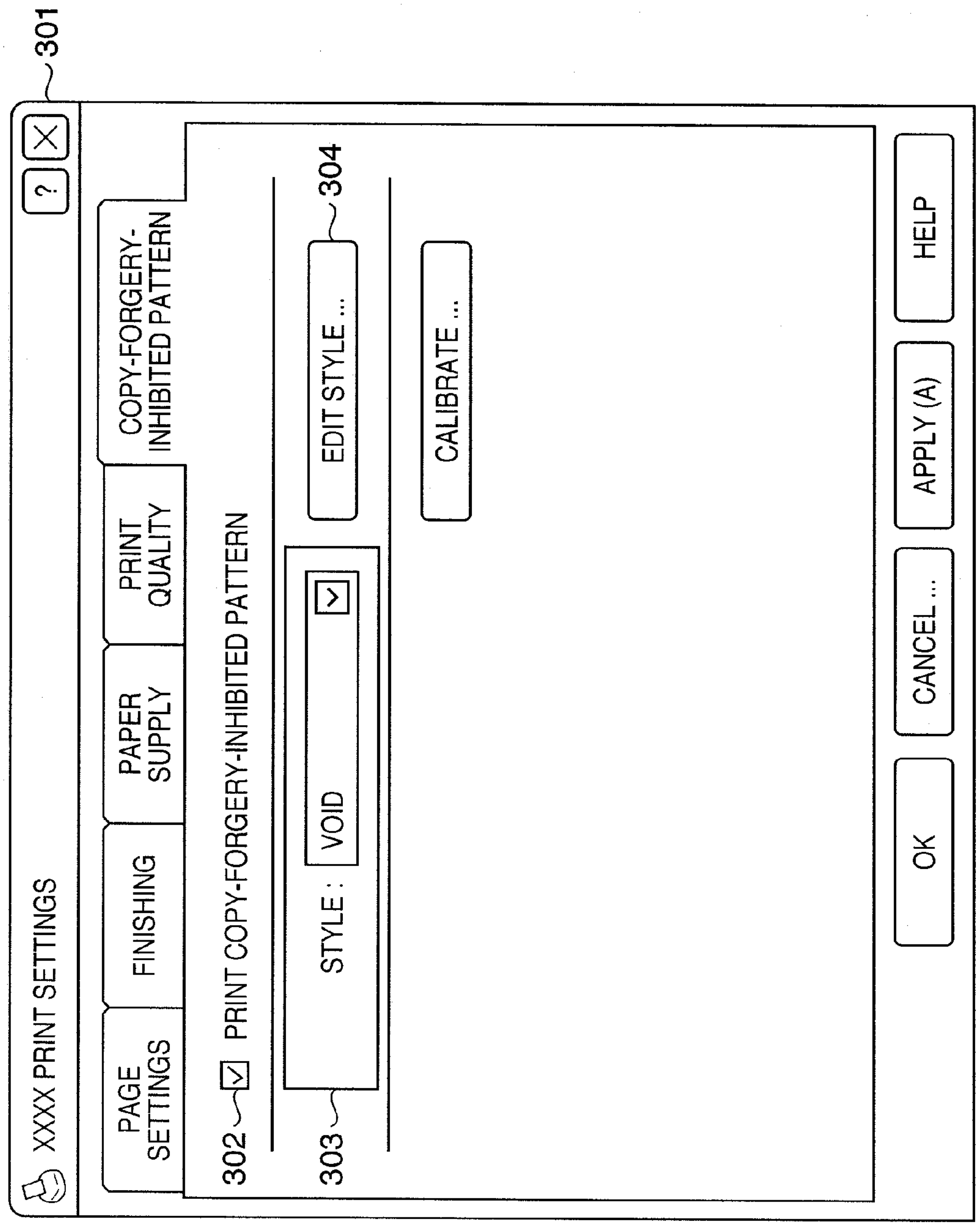
FIG. 3 is a diagram illustrating an example of an initial screen of a user interface for carrying out settings regarding copy-forgery-inhibited pattern printing.

Next, a setting screen regarding printing of the copy-forgery-inhibited pattern image, provided by the copy-forgery-inhibited pattern processing section 205 of the printer driver 203, shall be described using FIGS. 3 and 4. Here, printing that includes the copy-forgery-inhibited pattern image shall be called "copy-forgery-inhibited pattern printing".

FIG. 3 is a diagram illustrating an example of an initial screen of a user interface for carrying out settings regarding copy-forgery-inhibited pattern printing. In the example shown in FIG. 3, settings regarding copy-forgery-inhibited pattern printing can be carried out in a property sheet 301 within the dialog.

302 is a check box for specifying whether or not to carry out copy-forgery-inhibited pattern printing with regards to a certain print job. The details specified by the check box 302 are stored as added print information containing print setting information regarding the print data (original copy data). 303 represents style information for making it possible to specify plural pieces of setting information for copy-forgery-inhibited pattern printing using a single identifier (style). The printer driver 203 is configured so that plural styles are selectable, and the relationship between each style and predetermined information regarding copy-forgery-inhibited pattern printing is registered in a registry. When a button 304 is pressed, a style edit dialog 401, illustrated in FIG. 4A, is displayed.

Figure 4A:
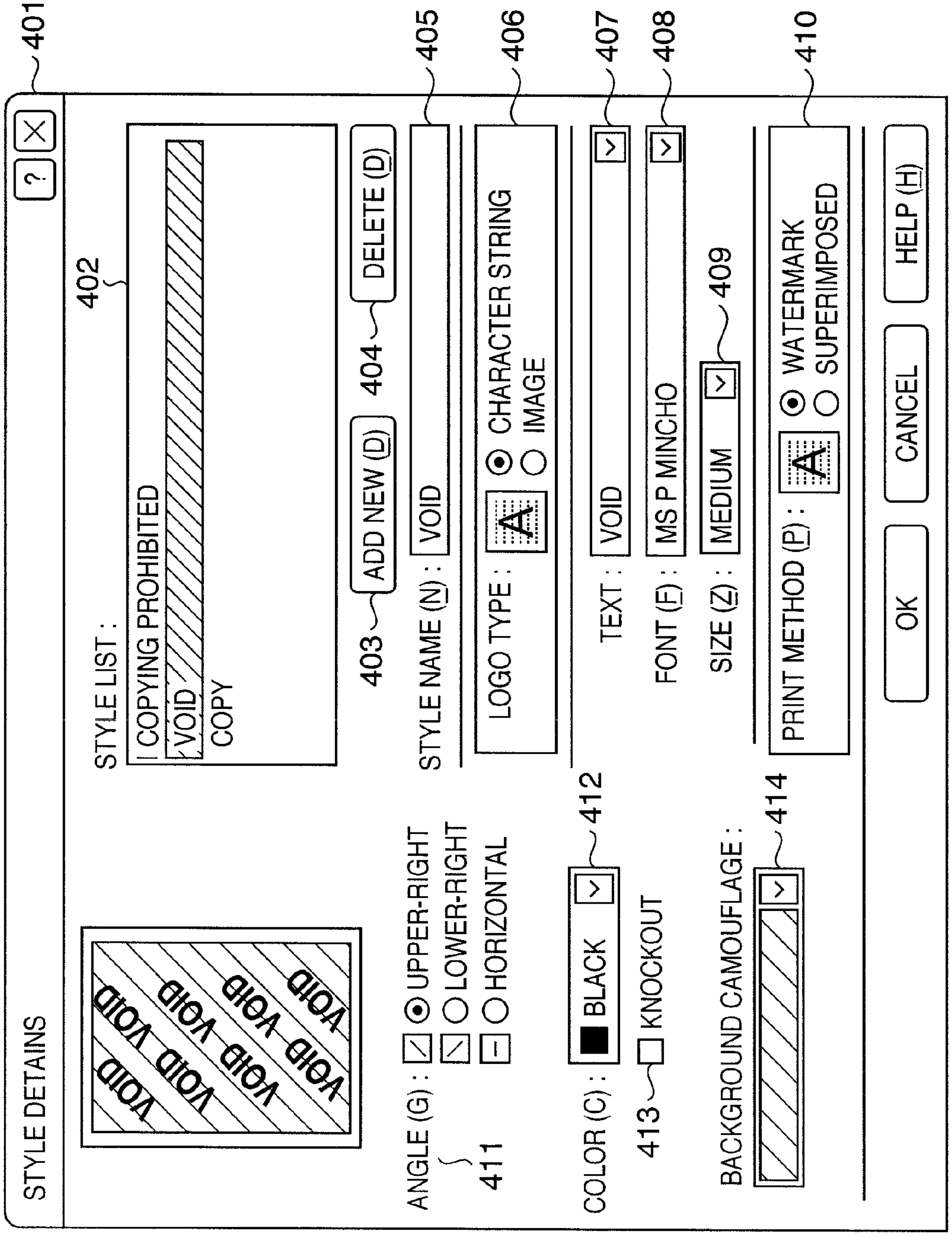
FIGS. 4A and 4B are diagrams illustrating examples of dialogs for editing individual advanced settings for copy-forgery-inhibited pattern printing.
Figure 4B:
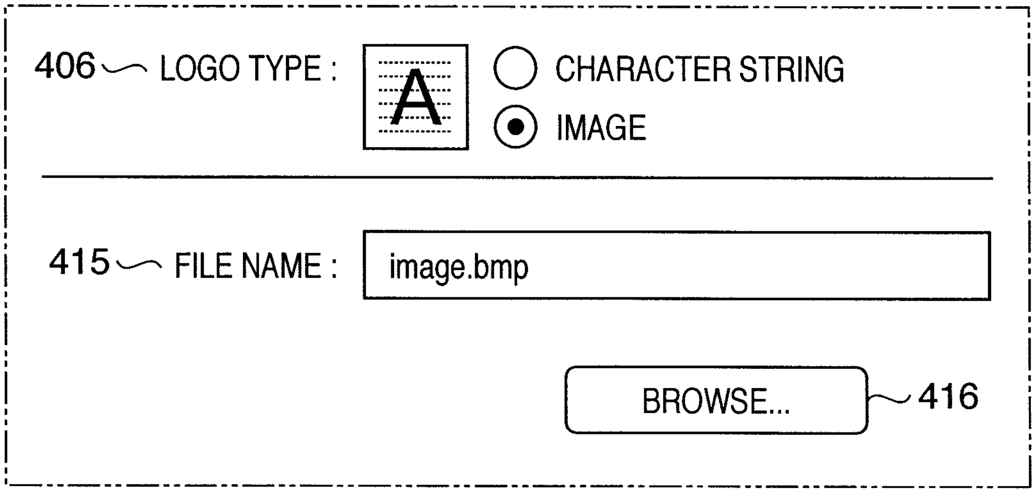

FIGS. 4A and 4B are diagrams illustrating examples of dialogs for editing individual advanced settings for copy-forgery-inhibited pattern printing. In FIG. 4A, 401 represents an overall dialog for editing copy-forgery-inhibited pattern information, in which the copy-forgery-inhibited pattern image generated based on the individual pieces of copy-forgery-inhibited pattern information, mentioned later, is displayed for previewing. 402 is a region for displaying the style information 303 as a list of selectable styles. Here, styles can be newly added and deleted by using buttons 403 or 404. 405 represents a region in which the name of the currently specified style is displayed.

406 is a radio button for selecting the type of drawn object to be used in the copy-forgery-inhibited pattern printing. When the user selects "character string" using the radio button 406, a text object can be used. Likewise, when the user selects "image", image data, such as a bitmap image, can be used. In the example shown in FIG. 4A, "character string" is selected, and thus setting information regarding a text object is displayed in 407 to 409 of the dialog 401, and can be edited.

Meanwhile, if "image" is selected by the radio button 406, the details shown in FIG. 4B are displayed instead of the setting information 407 to 409. Here, 415 represents an image file name, whereas 416 represents a "browse" button for displaying a file selection dialog (not shown).

Although in the present embodiment, the type of drawn object that can be used in copy-forgery-inhibited pattern printing is either a "character string" or an "image", it should be noted that the drawn object is not intended to be limited to these types. Furthermore, a configuration may be used in which plural types of drawn objects are used simultaneously.

407 represents a region for displaying and editing the character string to be used as the copy-forgery-inhibited pattern image. 408 represents a region for displaying and editing the font information of the character string. Although the selection screen shown here shows only the font name, the selection screen may be extended to make it possible to select font format information (boldface, italics, etc.), decorative character information, and the like.

409 represents a region for displaying and setting the font size of the character string to be used as the copy-forgery-inhibited pattern. A setup that allows the size to be specified in three stages, such as "large", "normal", and "small", is assumed here; however, a generally-used font size specification method, such as directly inputting the point number, may be employed as well. 410 is a radio button for setting the sequence by which the copy-forgery-inhibited pattern and the original document data are printed. In the case where "watermark printing" is specified by the radio button 410, the copy-forgery-inhibited pattern is drawn first, and then the original document data is drawn. However, in the case where "superimposed printing" is specified, the original document data is drawn first, and then the copy-forgery-inhibited pattern is drawn. This drawing order shall be described further later on.

411 is a radio button for specifying the angle at which the copy-forgery-inhibited pattern is arranged. Three angles, or "upper-right slant", "lower-right slant", and "horizontal", are selectable in this example. However, the angle selection method may be extended by providing a region into which a numerical value is directly inputted, making it possible to specify a custom angle, a slider bar that makes it possible to specify the angle in an intuitive manner, and so on.

412 represents a region for displaying and specifying the color used in the copy-forgery-inhibited pattern (the foreground pattern or the background pattern). 413 is a check box for specifying the foreground pattern or the background pattern to be reversed. When the check box 413 is not checked, a copy-forgery-inhibited pattern image is generated so that the foreground pattern is visualized in the duplicate. In other words, the check box 413 being unchecked indicates a setting that makes it possible to reproduce the foreground pattern in the duplicate.

However, when the check box 413 is checked, a copy-forgery-inhibited pattern image is generated so that the background pattern is visualized in the duplicate. In other words, the check box 413 being checked indicates a setting that makes it possible to reproduce the background pattern in the duplicate. At this time, the text information, image information, or the like specified as the foreground pattern is recognizable in the duplicate as knockout text/a knockout image.

414 represents a region for specifying a camouflage image that makes it difficult to recognize that a copy-forgery-inhibited pattern image has been added to the printed output to which the copy-forgery-inhibited pattern image has been added. The camouflage image can be selected from among a plurality of patterns. Furthermore, an option of not using a camouflage image is also provided.

(Data Format of Copy-Forgery-Inhibited Pattern Printing Setting Information)

Figure 5:
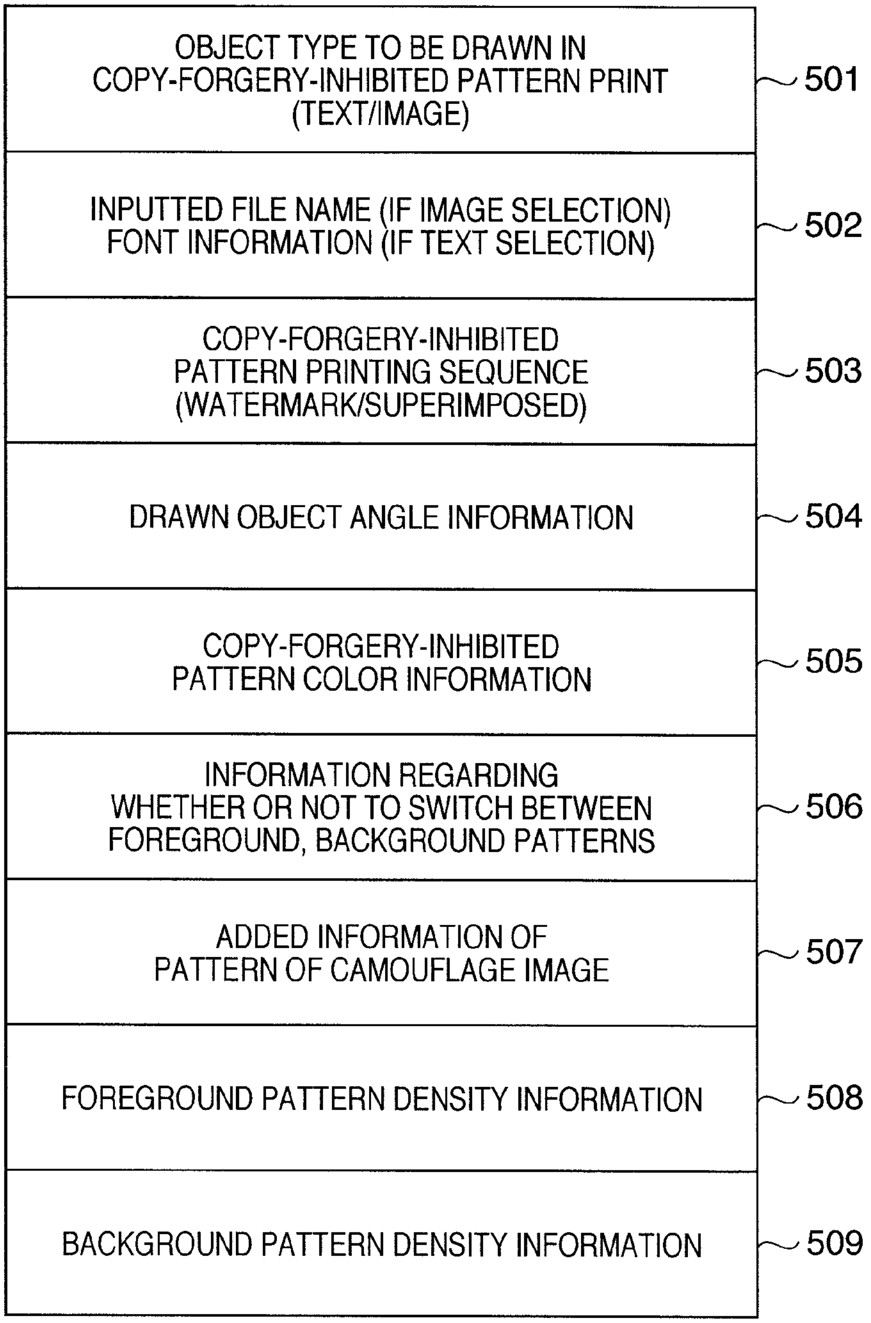
FIG. 5 is a diagram illustrating added print information regarding settings for copy-forgery-inhibited pattern printing.

Next, the abovementioned added print information regarding settings for copy-forgery-inhibited pattern printing shall be described using FIG. 5. Note that in the present embodiment, the added print information is stored in a job output file that is held as information that makes up a physical page to be printed. It is possible to employ various different methods for storing this added print information aside from the configuration shown in FIG. 5.

In FIG. 5, values indicating the type of object (text or image) to be drawn in the copy-forgery-inhibited pattern printing as selected using the radio button 406 are stored in a field 501. The setting information 407 to 409, or the image file name 415, is stored in a field 502, in accordance with the selection made using the radio button 406. To be more specific, a character string, font name, and size information are stored here when text has been selected, whereas the location of the image file to be inputted is stored here when an image has been selected.

Copy-forgery-inhibited pattern print sequence information specified using the radio button 410 and indicating whether the copy-forgery-inhibited pattern is to be drawn before or after the original document data is stored in a field 503. The angle information of the drawn object specified using the radio button 411 is stored in a field 504.

Information of the color to be used in the copy-forgery-inhibited pattern (foreground pattern, background pattern) as specified in the region 412 is stored in a field 505. Information regarding the foreground pattern or the background pattern as specified using the check box 413 is stored in a field 506. Added information of the pattern of the camouflage image as specified in the region 414 is stored in a field 507. Information regarding the density of the foreground pattern is stored in a field 508. Finally, information regarding the density of the background pattern is stored in a field 509.

(Copy-Forgery-Inhibited Pattern Drawing Process)

Figure 6:
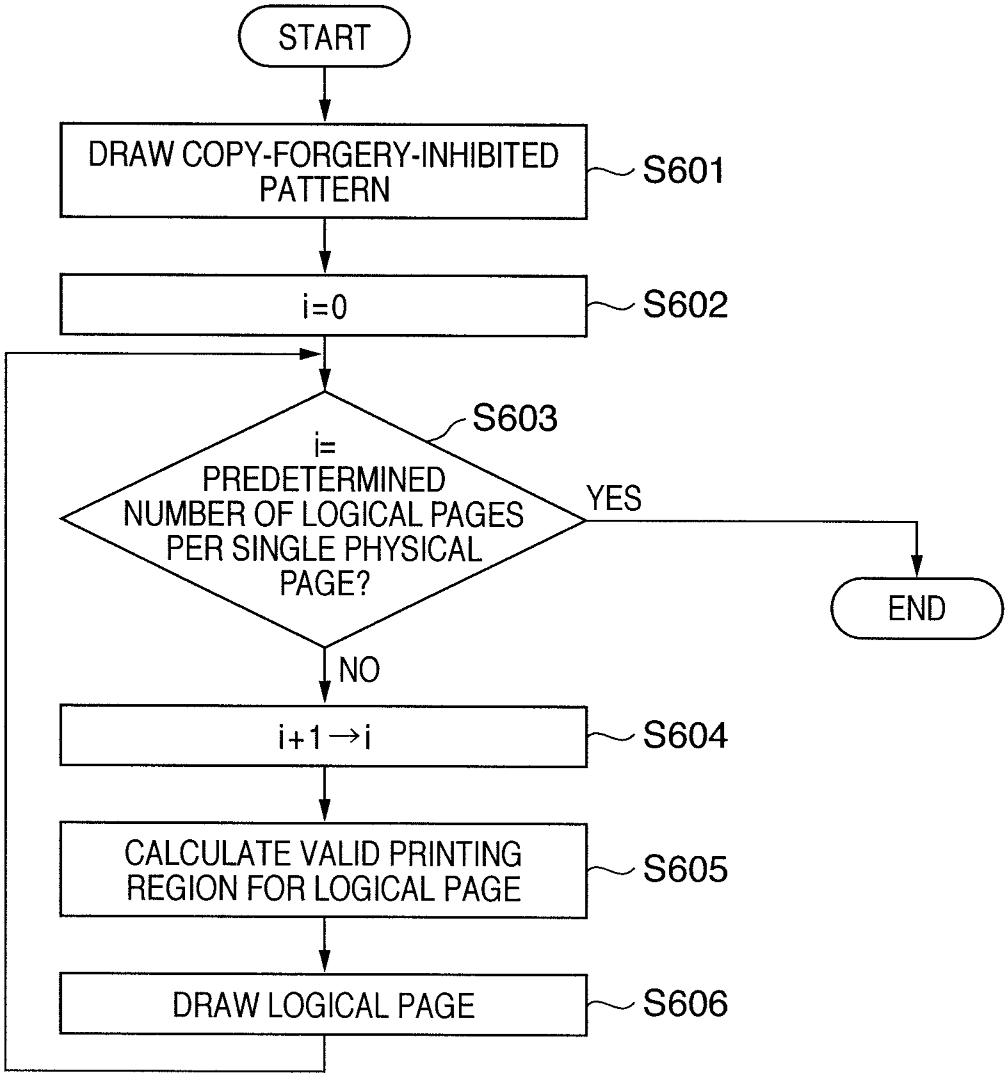
FIG. 6 is a flowchart illustrating a drawing process in the case where "watermark printing" has been specified as the printing sequence using a radio button 410.
Figure 7:
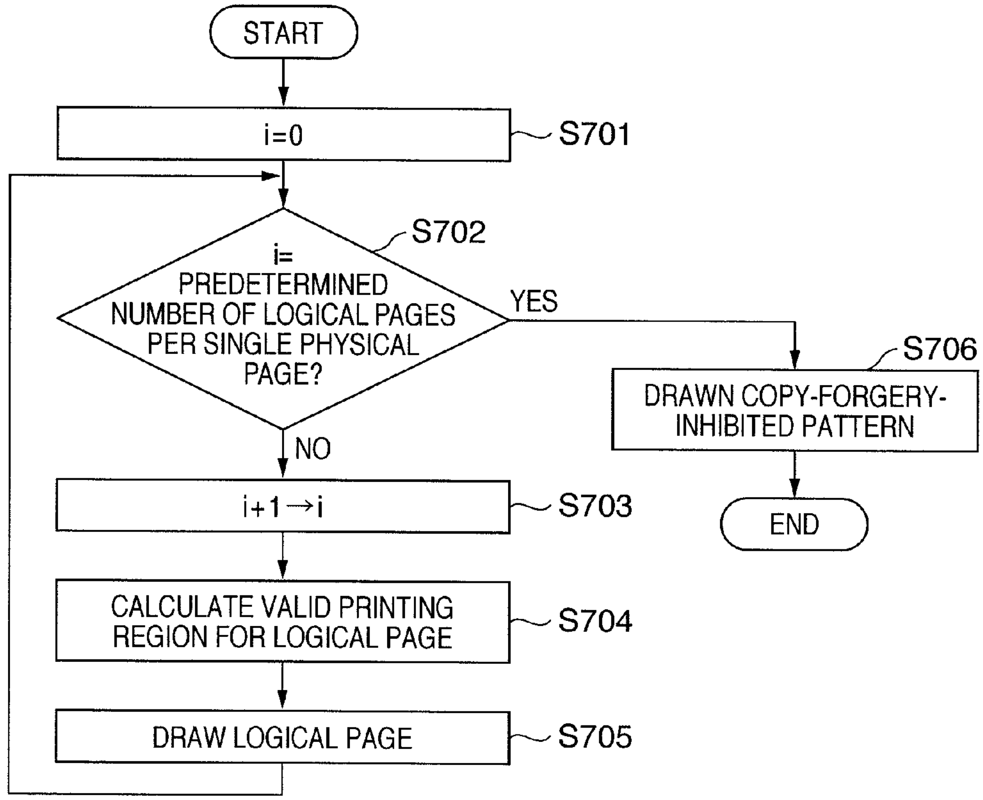
FIG. 7 is a flowchart illustrating a drawing process in the case where "superimposed printing" has been specified as the printing sequence using the radio button 410.

A drawing process occurring during copy-forgery-inhibited pattern printing shall be described hereinafter using FIGS. 6 and 7. FIG. 6 is a flowchart illustrating a drawing process in the case where "watermark printing" has been specified as the printing sequence using the radio button 410. Meanwhile, FIG. 7 is a flowchart illustrating a drawing process in the case where "superimposed printing" has been specified as the printing sequence using the radio button 410.

These processes are carried out during printing processing using a general printer driver. Furthermore, the processes described hereinafter are carried out by the CPU 1, which controls/executes the printing process.

First, the drawing process illustrated in FIG. 6 shall be described. This drawing process is "watermark printing", or in other words, drawing the copy-forgery-inhibited pattern before drawing the original document data.

In Step S601, the CPU 1 draws the copy-forgery-inhibited pattern in accordance with the information regarding the copy-forgery-inhibited pattern indicated by the copy-forgery-inhibited pattern information shown in FIG. 5. The details of this process shall be described later using FIG. 8. Next, the drawing process moves into drawing of the original document data. First, in Step S602, the CPU 1 resets a counter for counting the number of logical pages per single physical page (a single surface of a sheet of paper for printing).

Then, in Step S603, the CPU 1 determines whether or not the counter matches a pre-set number of logical pages per single physical page. If the result of the determination shows that the counter matches the number of logical pages, the drawing process ends.

However, if the result of the determination shows that the counter does not match the number of logical pages, the process moves to Step S604, and the CPU 1 adds 1 to the counter. Next, in Step S605, the CPU 1 calculates the valid printing region for the logical pages to be drawn thereafter based on the number of logical pages per single physical page and the counter value. Then, in Step S606, the CPU 1 reads out the current logical page number from printing setting information regarding the physical page (not shown), using the counter value as an index. Finally, the CPU 1 draws the logical page at a reduced size, so as to fit within the valid printing region. Of course, there is no need for reduction if plural logical pages are not laid out for printing. The above has been a description of the drawing process for "watermark printing".

Next, the drawing process illustrated in FIG. 7 shall be described. This drawing process is "superimposed printing", or in other words, drawing the copy-forgery-inhibited pattern after the original document data has been drawn.

First, in Step S701, the CPU 1 resets a counter for counting the number of logical pages per physical page (a single surface of a sheet of paper for printing). Then, in Step S702, the CPU 1 determines whether or not the counter matches a pre-set number of logical pages per single physical page. If the result of the determination shows that the counter matches the number of logical pages, the process moves to Step S706.

However, if the result of the determination shows that the counter does not match the number of logical pages, the process moves to Step S703, and the CPU 1 adds 1 to the counter. Next, in Step S704, the CPU 1 calculates the valid printing region for the logical pages to be drawn thereafter based on the number of logical pages per single physical page and the counter value. Then, in Step S705, the CPU 1 reads out the current logical page number from printing setting information regarding the physical page (not shown) using the counter value as an index. Finally, the CPU 1 draws the logical page at a reduced size, so as to fit within the valid printing region. Of course, there is no need for reduction if plural logical pages are not laid out for printing.

YES is determined in Step S702 once a predetermined number of logical pages have been laid out as a single physical page, and the process then moves to Step S706. In Step S706, the CPU 1 draws the copy-forgery-inhibited pattern in the valid printing region of the physical page acquired from the application, in accordance with the information regarding the copy-forgery-inhibited pattern indicated by the copy-forgery-inhibited pattern information shown in FIG. 5. As with the watermark printing, the details of this process shall be described later using FIG. 8.

Next, details of the copy-forgery-inhibited pattern drawing process for drawing the copy-forgery-inhibited pattern (S601 in FIG. 6; S706 in FIG. 7) shall be described using FIG. 8.

Figure 8:
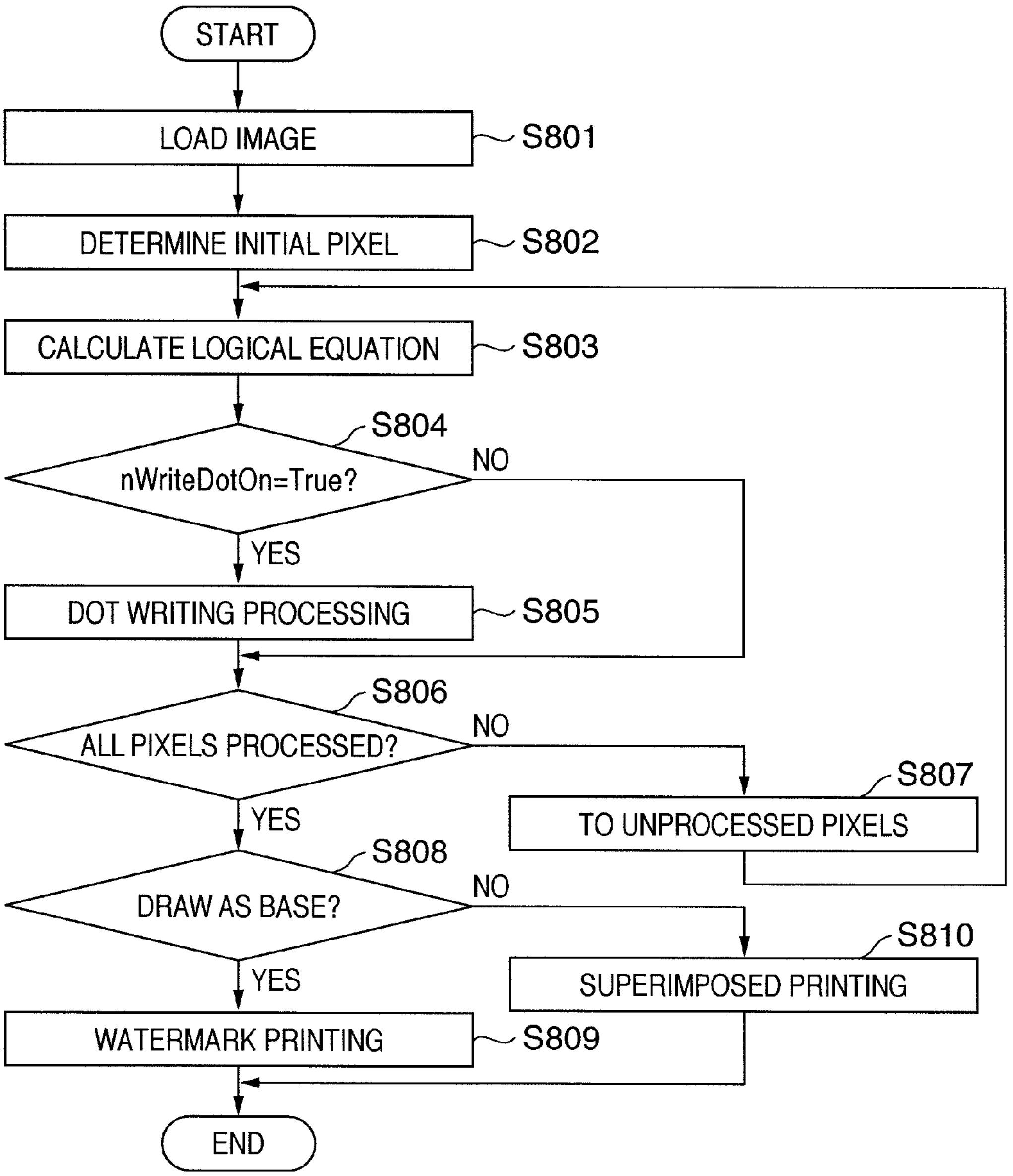
FIG. 8 is a flowchart illustrating details of a copy-forgery-inhibited pattern drawing process according to an embodiment of the present invention.

FIG. 8 is a flowchart illustrating the details of the copy-forgery-inhibited pattern drawing process according to the present embodiment. First, in Step S801, the CPU 1 acquires various information necessary for the drawing of the copy-forgery-inhibited pattern from the abovementioned job output file. The various information mentioned here is information such as an inputted background image, a background threshold pattern, a foreground threshold pattern, foreground/background region-specific images, a camouflage region-specific image, and the like.

Next, in Step S802, the CPU 1 sets the initial pixel used when generating the copy-forgery-inhibited pattern image. For example, in the case where the copy-forgery-inhibited pattern image is arranged by performing image processing in raster scan order from the top-left to the bottom-right of the overall input image, the top-left pixel is the initial pixel.

Next, in Step S803, the CPU 1 arranges the background threshold pattern, the foreground threshold pattern, the background/foreground region-specific image, and the camouflage image in tile form starting from the initial pixel of the inputted background image. Then, the CPU 1 executes a calculation on the pixels of the inputted background image that is to be processed, based on the following Equation (1). The CPU 1 determines whether or not to write the pixels values, which correspond to the dots during printing, into a memory region, based on the result of the calculation. The pixel values at this time correspond to inputted color information.

It should be noted that the background threshold pattern and foreground threshold pattern mentioned here are pattern data made up of 1s and 0s, which respectively indicate whether or not to write dots. These sets of pattern data are sets of data that have been made into patterns through a dithering matrix applied so as to create the foreground (latent) image and the background image.

$$nWriteDotOn=nCamouflage\times(nSmallDotOn\times\neg nHiddenMark+nLargeDotOn\times nHiddenMark) \quad (1)$$

The constituent elements of the above Equation (1) shall be defined hereinafter.

- nCamouflage: 0 if the pixel in question is a pixel within the camouflage region, and 1 if not, in the camouflage region-specific image
- nSmallDotOn: 1 if the pixel value of the background threshold pattern is black, and 0 if white (colors are not intended to be limited thereto)
- nLargeDotOn: 1 if the pixel value of the foreground threshold pattern is black, and 0 if white (colors are not intended to be limited thereto)

¬nHiddenMark: 1 if the pixel in question is a pixel corresponding to the latent image part, and 0 if corresponding to the background part, in the foreground/background region-specific image nHiddenMark: the negative of ¬nHiddenMark. 0 in the foreground part, and 1 in the background part.

Note that it is not necessary to perform calculation on each pixel to be processed using all of the elements of the above Equation (1). The speed of the process can be increased by omitting unnecessary calculations.

For example, if nHiddenMark=1, then ¬nHiddenMark=0, and if nHiddenMark=0, then ¬nHiddenMark=1. Therefore, if nHiddenMark=1, then the value of nLargeDotOn can be used as the value of the following Equation (2), whereas if nHiddenMark=0, then the value of nSmallDotOn can be used as the value of Equation (2)

Furthermore, as can be seen in the above Equation (1), the value of nCamouflage affects the overall calculation of the equation, and thus if nCamouflage=0, then nWriteDotOn=0. Thus when nCamouflage=0, the calculation of the following Equation (2) can be omitted.

$$(\mathrm{nSmallDotOn}\times\neg\mathrm{nHiddenMark}+\mathrm{nLargeDotOn}\times\mathrm{nHiddenMark}) \tag{2}$$

An image having a size determined by the lowest common multiple of the vertical/horizontal lengths of each of the background threshold pattern, the foreground threshold pattern, the foreground/background region-specific images, and the camouflage region-specific image is the smallest unit that is repeated throughout the generated copy-forgery-inhibited pattern image. For this reason, in the copy-forgery-inhibited pattern drawing process, only part of the copy-forgery-inhibited pattern image, or in other words, the smallest unit that is repeated, is generated and repeatedly arranged in tile form, so that the repeatedly arranged parts collectively become the same size as the generated image itself. This makes it possible to reduce the processing time required for generating the copy-forgery-inhibited pattern image.

Next, in Step S804, the CPU 1 determines the results of the calculation performed in Step S803 (the value of nWriteDotOn). If nWriteDotOn=1, the process moves to Step S805, whereas if nWriteDotOn=0, the process moves to Step S806.

In Step S05, the CPU 1 carries out a process for setting the values of the pixels corresponding to dots during printing. Here, the pixel values can be changed depending on the color of the copy-forgery-inhibited pattern image. In the case where a black copy-forgery-inhibited pattern image is created, the pixels to be processed in the copy-forgery-inhibited pattern image are set to black pixels. A color copy-forgery-inhibited pattern image can be created by setting the pixels to be processed to cyan, magenta, or yellow in accordance with the color of the toner or ink of the printer.

Furthermore, if the image data of this image is from 1 to several bits per pixel, the color values can be expressed using index colors. "Index colors" refers to a method for expressing image data. Specifically, it is a method in which color information that appears frequently within the color image in question is set to an index (for example, index 0 is used for white, index 1 is used for cyan, and so on), and the value of each pixel is expressed through a number of the index in which the color information is written. For example, the first pixel value is a value of index 1, the second pixel value is a value of index 2, and so on, and the expression is carried out thereby.

Next, in Step S806, the CPU 1 determines whether all the pixels in the region to be processed have been processed. The process moves to Step S807 if all the pixels in the region to be processed have not been processed, where the unprocessed pixels are selected, and then the processes of the abovementioned Steps S803 to S806 are executed thereon.

However, if the result of the determination in Step S806 indicates that all the pixels in the region to be processed have been processed, the process moves to Step S808.

Figure 9:
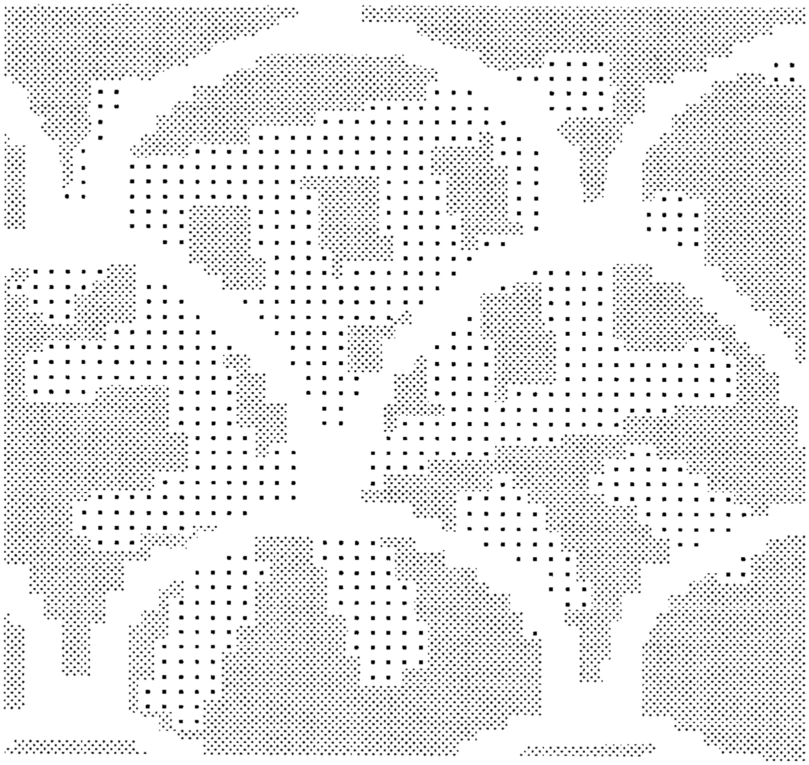
FIG. 9 is a diagram illustrating an example of the generation of a copy-forgery-inhibited pattern image on which boundary processing has also been executed.
Figure 10:
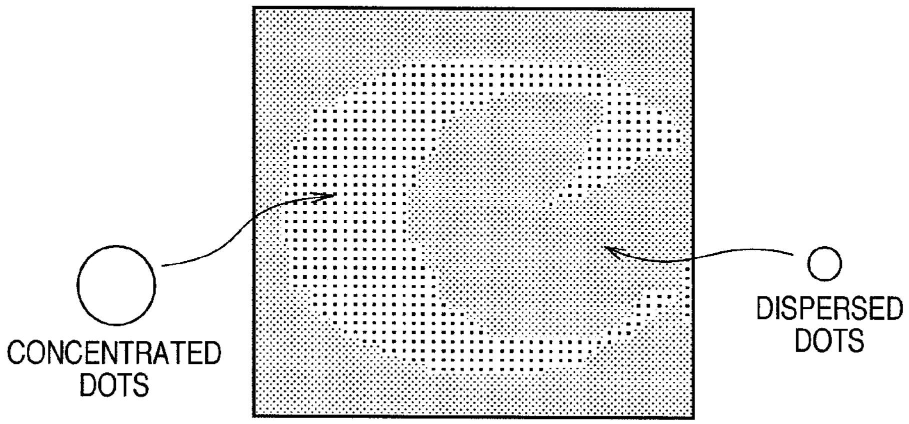
FIG. 10 is a diagram illustrating the state of dots in two image regions, or a latent image part and a background part.
Figure 11A:
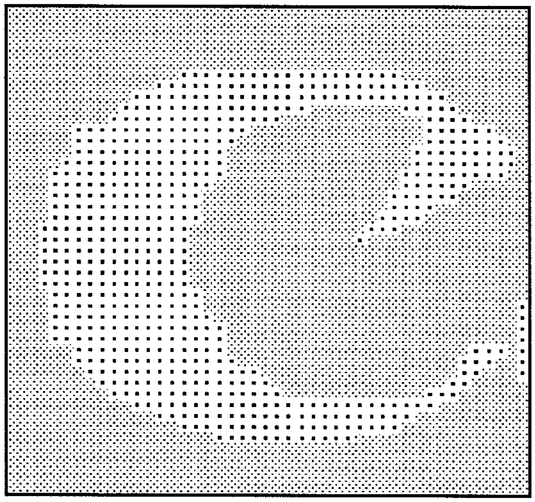
FIGS. 11A and 11B are diagrams illustrating an image that has been visualized in a duplicate, and conceptually illustrates visualization in the duplicate where dots have been concentrated, and a lack of reproduction in the duplicate where dots have been dispersed.
Figure 11A:
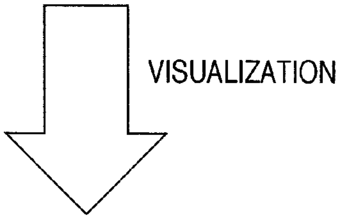
Figure 11B:
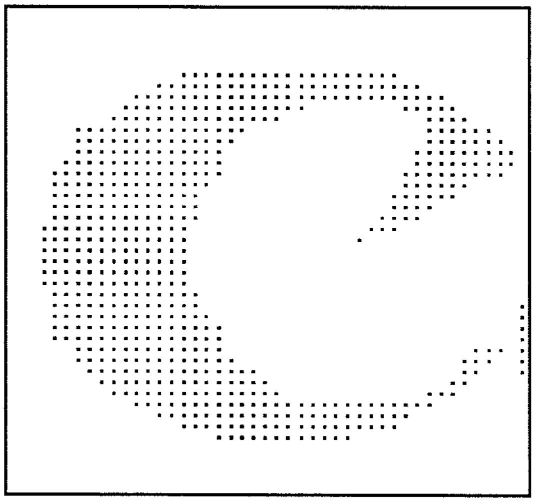

The copy-forgery-inhibited pattern image can thus be generated through the process described above. It should be noted that when only this processing is executed, there is a chance that clusters of dots will arise at the border between the foreground and background in the foreground/background region-specific image, making the outline of the foreground apparent, and thus causing a disadvantage in that the effectiveness of the anti-counterfeit copy-forgery-inhibited pattern decreases. Accordingly, this process may be executed along with a process that prevents clusters of dots from arising at the border between the foreground and background in the foreground/background region-specific image (boundary processing). FIG. 9 is a diagram illustrating an example of the generation of a copy-forgery-inhibited pattern image on which boundary processing has also been executed.

FIG. 8 shall once again be referred to here. First, a copy-forgery-inhibited pattern image is generated through the abovementioned process. While the copy-forgery-inhibited pattern image generation process is the same as that indicated in S601 of FIG. 6 and S706 of FIG. 7, the methods for drawing the generated copy-forgery-inhibited pattern image and the original document data differ from one another.

In Step S808, it is determined whether or not the copy-forgery-inhibited pattern image is to be drawn as the base. Here, according to the processing in S601 of FIG. 6, the copy-forgery-inhibited pattern image is the base, and thus the process moves to Step S809, and a watermark drawing process is executed. To be more specific, after the copy-forgery-inhibited pattern image is drawn, a process that draws characters or the like created using an application program transparently (draws the normal data after the copy-forgery-inhibited pattern image has been drawn) is executed. In other words, no special processing is carried out when drawing the copy-forgery-inhibited pattern image.

However, according to the processing in S706 of FIG. 7, the copy-forgery-inhibited pattern is to be drawn with the normal data, which has already been drawn, used as the base, and thus the process moves to Step S810, where a superimposed drawing process is executed. In this case, the copy-forgery-inhibited pattern is drawn superimposed on top of the characters or the like created using the application program, and thus simply drawing the copy-forgery-inhibited pattern will cause the base to be overwritten, thus becoming invisible.

Accordingly, using AND and OR logical drawing makes it possible to avoid completely overwriting the base. For example, if the base pixels are white (in other words, the pixel value is 0), logical drawing that draws the pixels of the copy-forgery-inhibited pattern that correspond to the white base pixels is carried out.

(Example of Operational Section for Setting Latent Image Character String)

Figure 12:
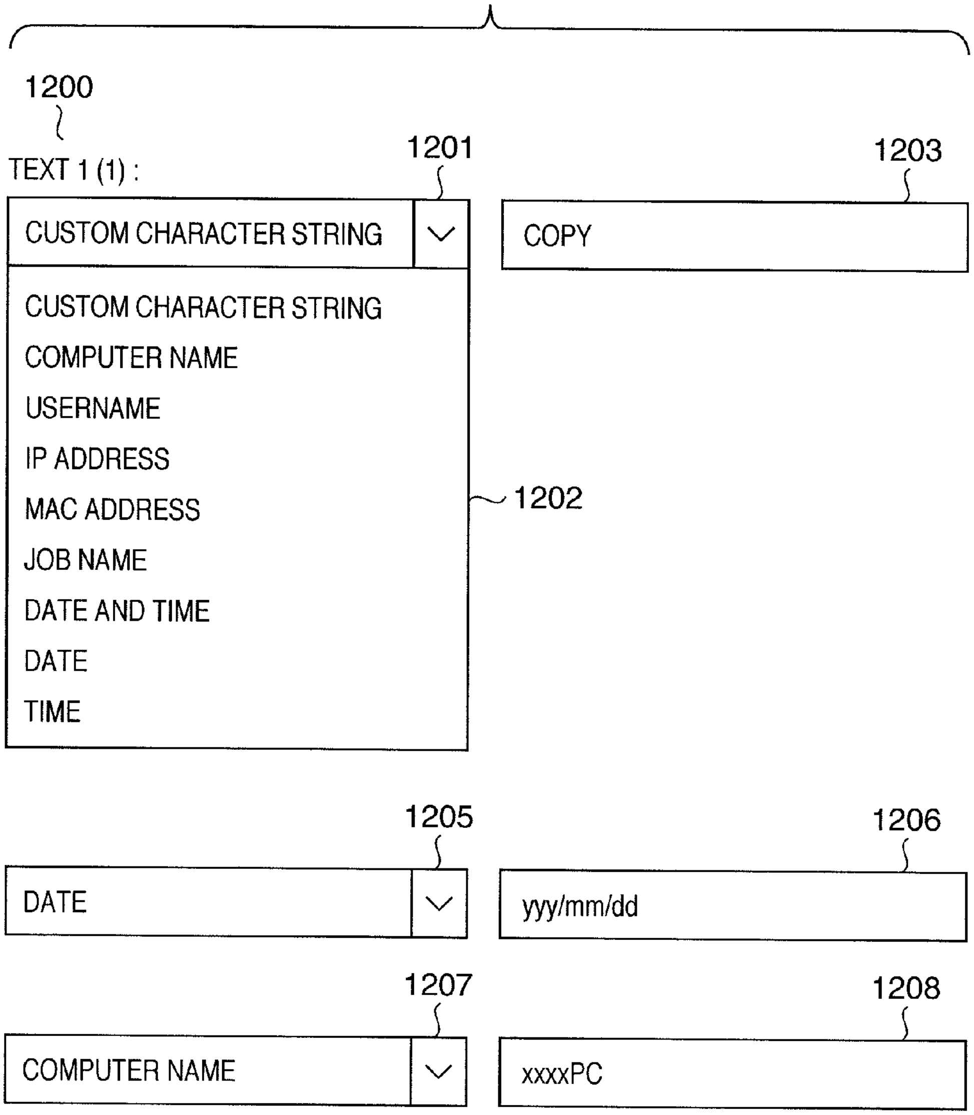
FIG. 12 is a diagram illustrating an example of an operational section for setting a latent image character string, which is variable information.

Next, the operational section, through which variable information such as usernames, computer names, and so on specified to be the visualized copy-forgery-inhibited pattern image is set, shall be described using FIG. 12.

FIG. 12 is a diagram illustrating an example of the operational section that sets a latent image character string, which is variable information. As shown in FIG. 12, the content to be set as the latent image character string is selected from the drop-down box 1201 located below a "Text 1" menu 1200. Note that the content that can be set is listed as shown in 1202.

"Custom character string", which represents information that is not variable, is selected from this list 1202. In this example, "COPY" has already been inputted into an edit box 1203, and thus the content is finalized at this point in time.

Furthermore, as indicated by 1205, when the variable information "date" is selected from the list 1202, the user cannot input the character string, which is instead acquired and finalized when the copy-forgery-inhibited pattern image is printed. Therefore, the exemplary date format, "yyyy/mm/dd", is displayed with a text box 1206 in a grayed-out state.

Similarly, as indicated by 1207, when the variable information "computer name" is selected from the list 1202, the computer name acquired at that time is displayed with a text box 1208 in a grayed-out state. Here, "xxxxPC" is used as a specific example of the computer name.

In this manner, when variable information is selected using the operational section, either an exemplary format or a specific example is displayed. When a specific example is to be displayed, it is necessary for the information to be acquired upon the operational section being opened.

(Standard Operations)

Figure 13:
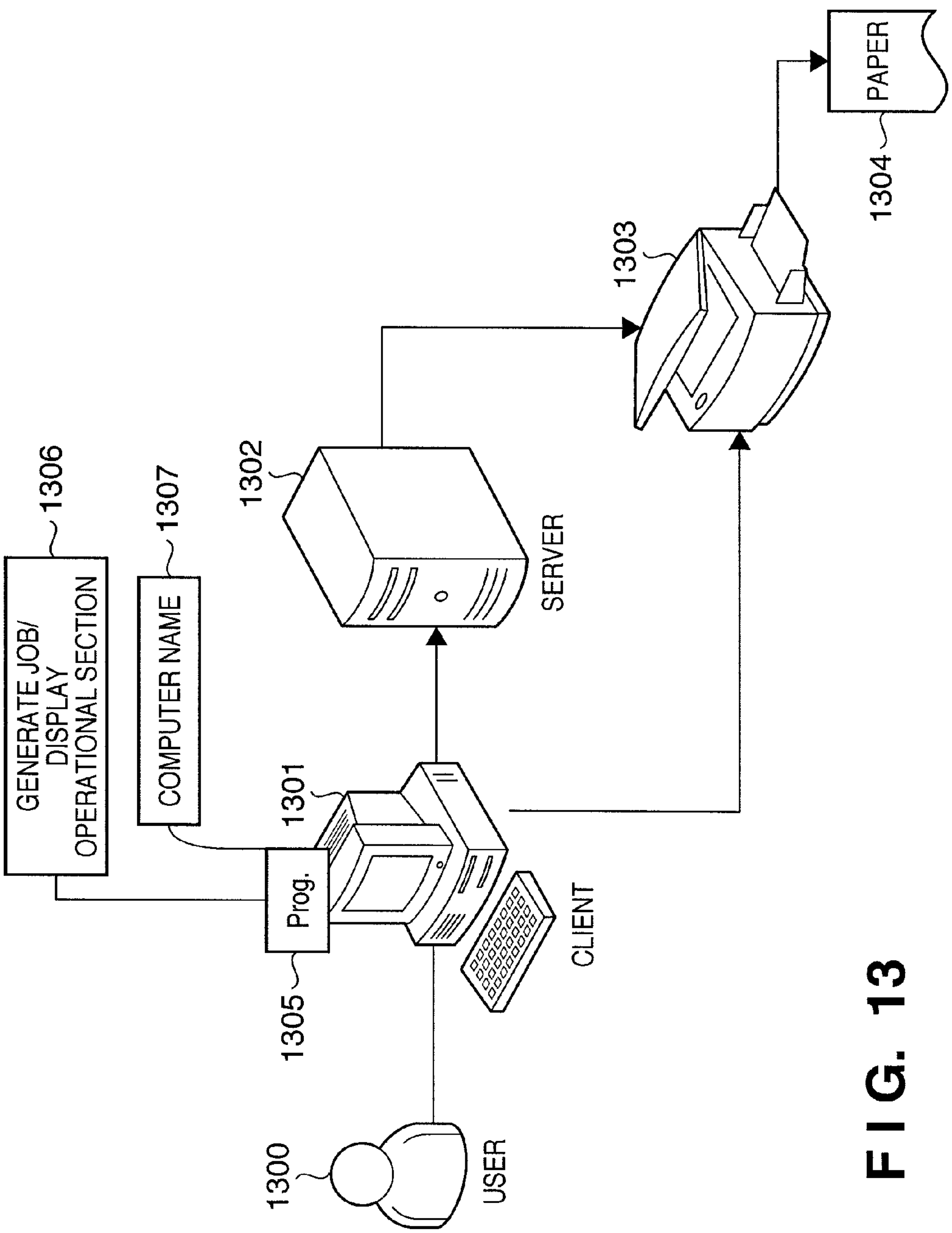
FIG. 13 is a diagram for illustrating an outline of operations performed by a general client/server system.

Here, operations performed when acquiring the abovementioned variable information "computer name" shall be described using FIG. 13.

FIG. 13 is a diagram for illustrating an outline of operations performed by a general client/server system. A user 1300 uses a client computer 1301, and prints using a printer 1303. A program 1305 acquires a computer name 1307 of the client computer 1301 when a print job is generated or when the abovementioned operational section is displayed. The acquired computer name 1307 is then used in the operational section displayed in the client computer 1301, the latent image character string on paper 1304, and so on.

Note that because job generation 1306 is carried out in the client computer 1301, the same process is used as when directly connecting to the printer 1303, when connecting via a server 1302, and so on. The program is shared as well.

(Extension of Operations)

Figure 14:
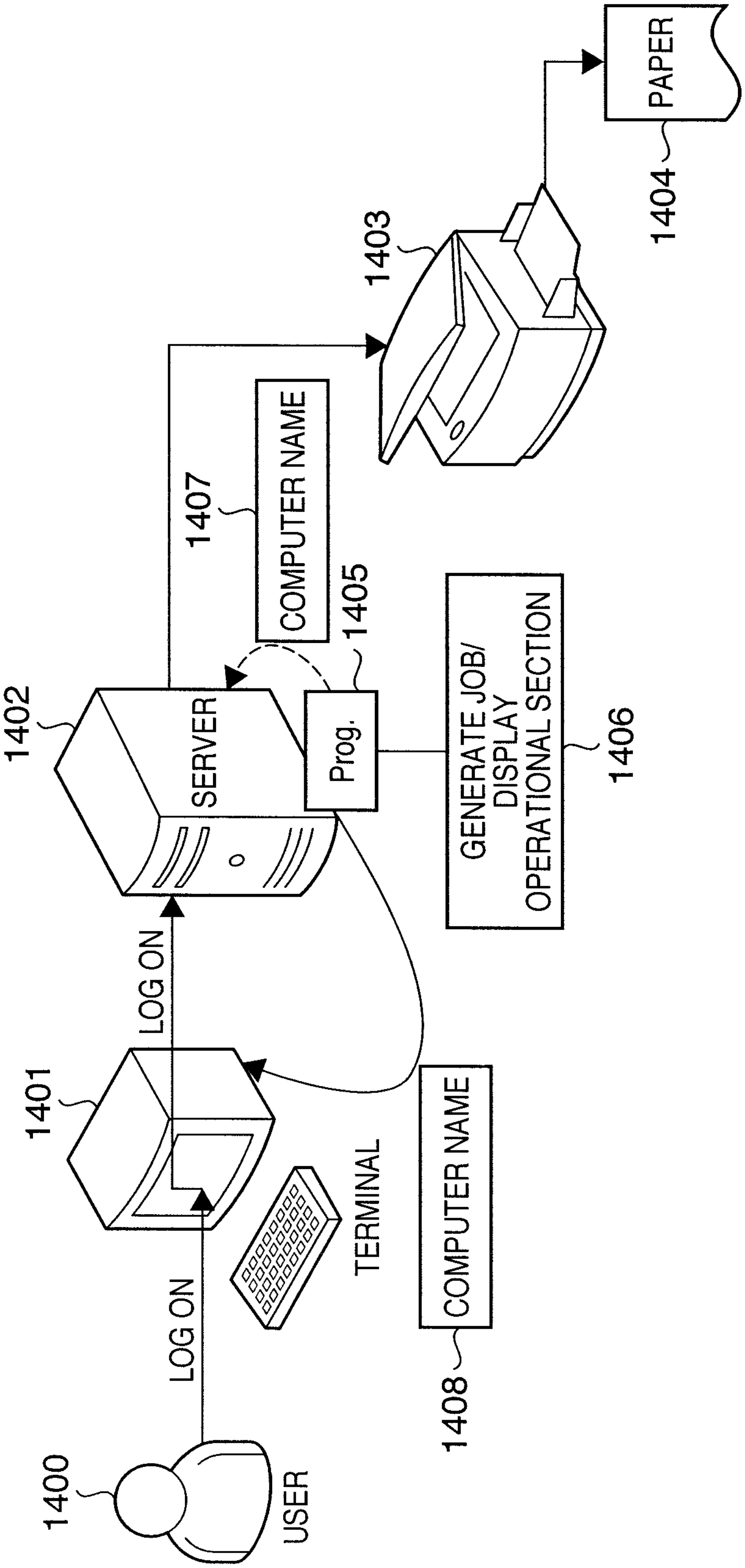
FIG. 14 is a diagram for illustrating an outline of an operation extension according to an embodiment of the present invention.

Next, operations for acquiring the variable information "computer name" in an environment in which a terminal is connected to an integrated server shall be described using FIG. 14.

FIG. 14 is a diagram for illustrating an outline of an operation extension according to the present embodiment. A user 1400 uses a terminal 1401, and prints using a printer 1403. The user logs on to an integrated server 1402 from the terminal 1401. If is the operations are the same as those illustrated in FIG. 13, a program 1405 acquires a computer name 1407 of the server computer 1402 when a print job is generated or when the abovementioned operational section is displayed. However, the computer name 1407 is the name of the server 1402, which each user logs on to, and thus is information that has low identifiability. The program 1405 judges the operating environment in order to maintain the identifiability of the computer name, and acquires a computer name 1408 of the terminal 1401. The acquired computer name 1408 is then used in the operational section displayed in the computer 1402, the latent image character string on paper 1404, and so on.

Although job generation 1406 is carried out in the server 1402, this process is an extension on the process of FIG. 13 in that 1407 and 1048 are used as the computer names and information is acquired from other computers as well. However, the same process as that shown in FIG. 13 may be used in the case where the print job is generated and the operational section is displayed in the terminal 1401. The program is shared as well. A single program judges the environment and selects the appropriate information.

Note that the username with which the user 1400 logs on to the server 1402 is information that has higher identifiability when compared to the computer name 1407.

Meanwhile, using variable information such as an IP address, MAC address, or the like leads to problems with identifiability in such an integrated environment, in the same manner as the computer name 1407. Therefore, the IP address, MAC address, and the like are acquired in the same manner as the computer name 1407.

(Example of Extension of Operational Section)

Figure 15:
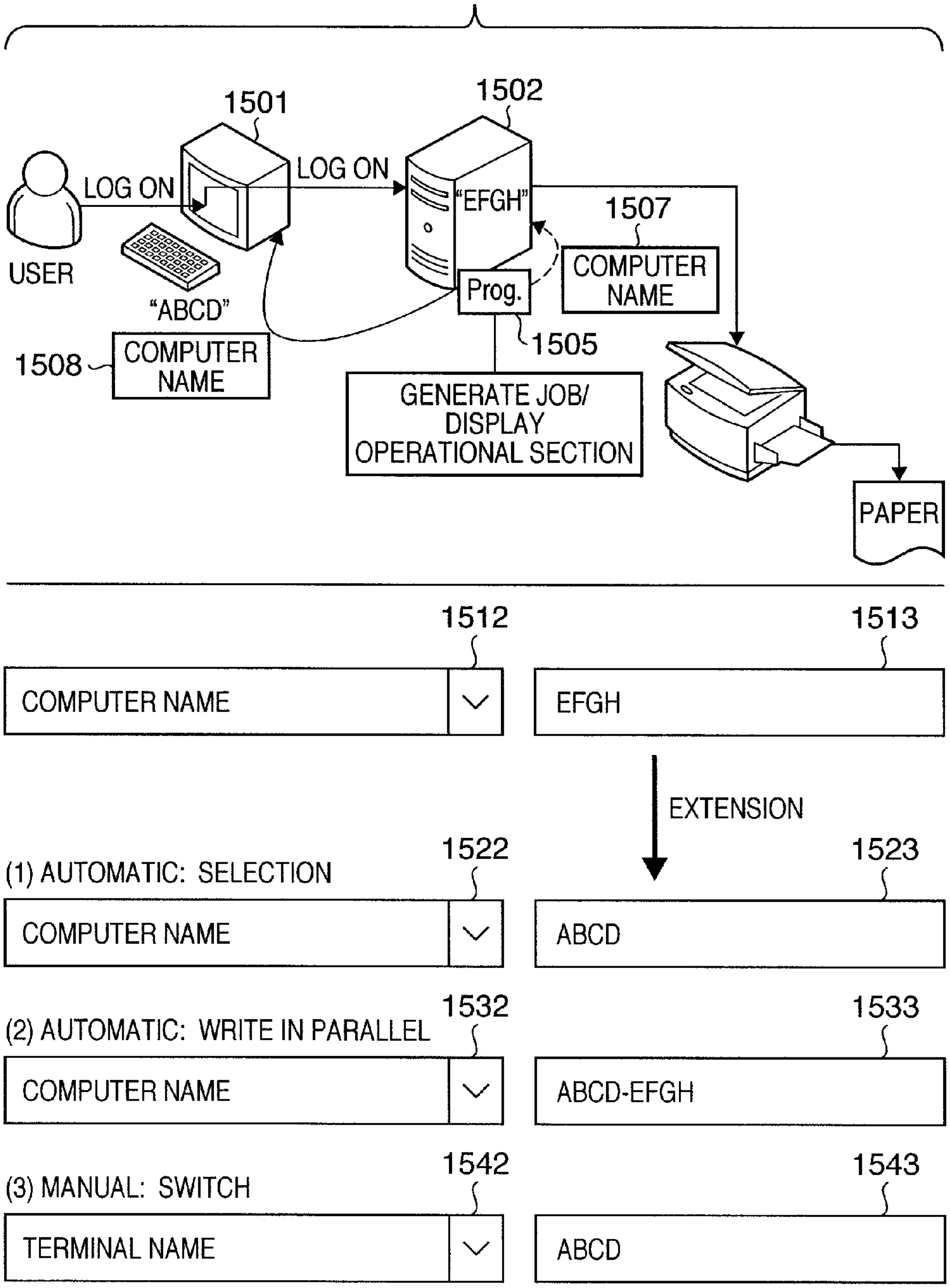
FIG. 15 is a diagram for illustrating an operation for acquiring variable information according to an embodiment of the present invention.

Here, using FIG. 15, additional descriptions shall be given regarding operations that use a specific computer name and the operational section.

FIG. 15 is a diagram for illustrating an operation for acquiring variable information according to the present embodiment. In FIG. 15, a user uses a terminal 1501, and prints using a printer. A program 1505 acquires "EFGH" 1507, which is the name of a server computer 1502, when a print job is generated or when the abovementioned operational section is displayed.

In the case where "computer name" is selected as the variable information in an operational section 1512, "EFGH" 1513 is displayed in the operational section (and in the latent image character string).

The program 1505 judges the operating environment in order to maintain the identifiability of the computer name; the operations of the program 1505 are extended so that the program 1505 also acquires "ABCD" 1508, which is the name of the terminal 1501. (1) to (3), shown in FIG. 15, shall be described hereinafter as specific examples. Note that the program may be designed so that only one of the following (1) to (3) function. Furthermore, a user interface for specifying which of the functions of (1) to (3) are to be executed may be displayed, and the user may be allowed to select therefrom.

(1) Automatic: Selection

A user selects the variable information "computer name" in an operational section 1522. Although there is no change in the selection, the operational section (and latent image character string) automatically select and display the name of the terminal 1501, or "ABCD" 1523, based on the judgment result.

(2) Automatic: Write in Parallel

A user selects the variable information "computer name" in the operational section 1532. Although there is no change in the selection, the operational section (and latent image character string) automatically write and display the names of the terminal 1501 and the server 1502 in parallel, such as "ABCD-EFGH" 1533, based on the judgment result. Taking into consideration that the latter part of the character string can be cut off due to limits on the number of characters, the sequence in which the names are written is client name first, server name second (however, if the entire character string will fit, no characters will be cut off).

Basically, the variable information is written in parallel starting with the name with higher identifiability; however, note that the same result can be achieved even if the sequence by which the variable information is written is changed. The same result can also be achieved even if variable information types for which the order in which the variable information is written can be manually selected, such as "date and time". The character string is lengthened due to the information being written in parallel. In such a case, the latent image character string layout within the copy-forgery-inhibited pattern is automatically controlled so as not to burden the user; an example of this shall be described later.

(3) Manual: Switching

This is equivalent to adding information types and executing the abovementioned (1) manually.

A user selects the variable information "terminal name" in an operational section 1542. The operational section (and latent image character string) switch to a display of the name of the terminal 1501, or "ABCD" 1543, based on the judgment result and setting changes.

(Data Construction Example)

Figure 16:
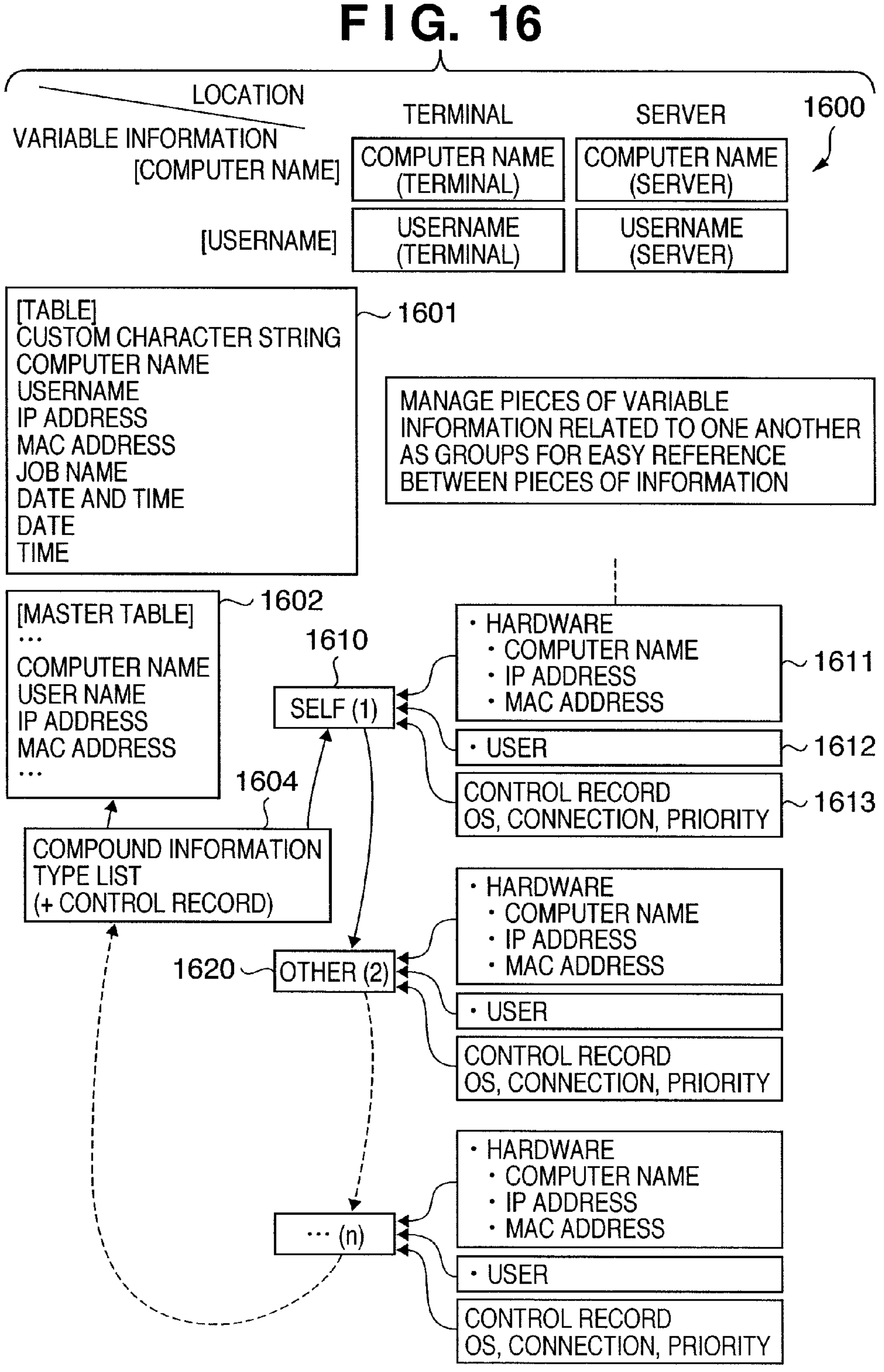
FIG. 16 is a diagram illustrating an example of an extension for constructed data.

Here, an example of an extension for constructed data shall be described using FIG. 16.

In FIG. 16, 1600 represents plural login names and computer names, as indicated in FIGS. 14 and 15. As shown in FIG. 16, there are plural computer names and user names under a configuration including a terminal and an integrated server. Taking this situation into consideration, referring to an already-present variable information table 1601 shows that attributes regarding people and items (PCs) are acquired from a plurality of operational locations.

Therefore, as indicted by 1602, the data is extended so that some types of variable information can hold compound information. The already-present table 1601 becomes a master table 1602. In the example indicated by 1602, the computer name, username, IP address, and MAC address used for identifying people and items are taken as compound information types from among the variable information, and are thus distinguished from other pieces of variable information (simple information types).

The master table 1602 holds a compound information type list 1604. The root 1604 of the list also includes a control record. The compound information type list 1604 holds the variable information distinguished as compound information type in a child list format. Self (node 1) 1610, which is information acquired by the program based on its own operation environment, has a hardware variable information group 1611, a user variable information group 1612, and a control record 1613 as child lists.

Note that pieces of variable information related to one another are managed as groups for easy reference between pieces of variable information. Furthermore, the physical hardware variable information group 1611 includes three types of unique variable information, or the computer name, IP address, and MAC address. Information and results used for acquisition processing are stored in the control record 1613. The OS of each operating device, the connection method, and the priority, or in other words, the sequence by which the print job flows from start to finish, and so on are stored therein.

Other (node 2) 1620, which is information acquired from another device, has the same data structure as 1610. The nodes in the list can be increased as necessary.

Causing the information of a single node from the compound information type list 1604 to be reflected in the master table is equivalent to the "selection" illustrated in FIG. 15, whereas causing the information of plural nodes to be reflected in the master table is equivalent to the "writing in parallel" illustrated in FIG. 15. The control records indicated by 1604 and 1613 are also utilized during the process for reflecting results in this master table.

(Exemplary System Configuration)

Figure 17:
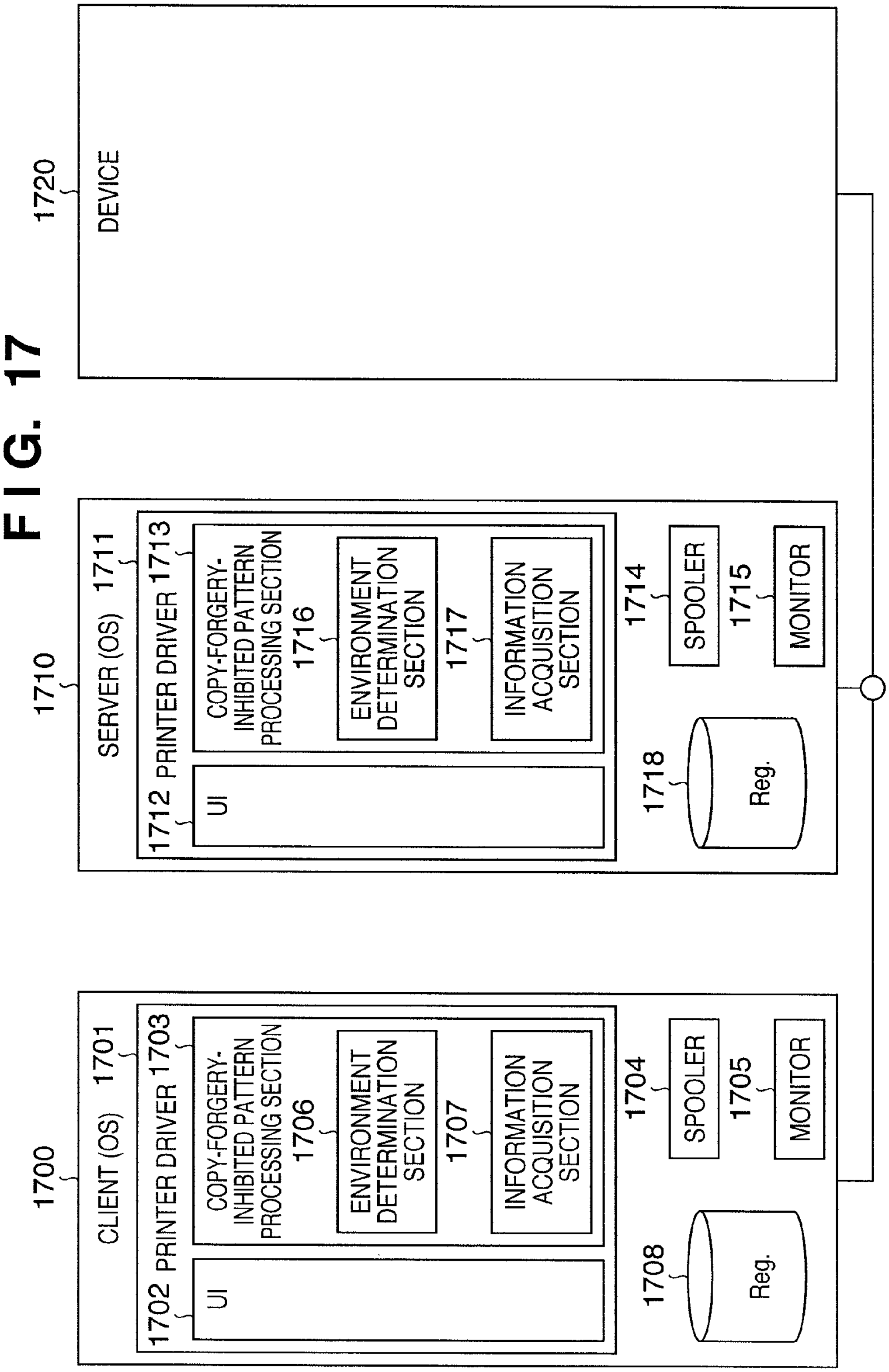
FIG. 17 is a block diagram illustrating an example of a system configuration according to an embodiment of the present invention.

Next, an example of a configuration that carries out data extension in the abovementioned client/server system shall be described using FIG. 17.

FIG. 17 is a block diagram illustrating an example of a system configuration according to the present embodiment. As shown in FIG. 17, a printer driver 1701 is present in a client (OS) 1700. This printer driver 1701 has an operational section (UI) 1702 and a copy-forgery-inhibited pattern image processing section 1703. The copy-forgery-inhibited pattern processing section 1703 has an environment judgment section 1706 and an information acquisition section 1707. Codes for distinguishing already-known environments are included in the environment judgment section 1706. Meanwhile, codes for acquiring information in accordance with the environment are included in the information acquisition section 1707.

A registry 1708, in which settings of the operational section 1702 and the like are stored, a spooler 1704, in which print jobs are spooled, and a monitor 1705 for these, are disposed in the OS.

Note that although the descriptions regarding FIG. 17 discuss a client, it goes without saying that the descriptions may discuss a terminal. Note that a server (OS) 1710 has the same configurations 1711 to 1718.

A printer device 1720, the client 1700, and the server 1710 are connected via a network.

(Basic Flow)

Thus far, an example has been given regarding an outline of extension operations, the operational section, and data. Next, a basic flow shall be described using FIGS. 18A and 18B. Note that the overall flow shall be described here, whereas the procedures of the environment judgment and result selection processes, which are characteristic, shall be described later.

First, in Step S1801, it is confirmed whether the acquired variable information type is a computer name, a username, or another type of information. Note that here, the descriptions given focus on the flow starting with the compound information type computer name in Step S1802. Descriptions regarding the flow starting with the compound information type username in Step S1803, which is a similar flow, shall be partially omitted, whereas the entirety of the simple information type flow starting in Step S1804 shall be omitted.

A process for acquiring self environment information is executed starting with Step S1805. In Step S1806, the self computer name is acquired, and in Step S1807, the fact that the self environment information acquisition has been completed is registered. Then, in Step S1808, it is determined whether or not the information is compound information type and whether or not the information depends on the operation environment. If the result of the determination shows that the information depends on the operation environment, the process moves to Step S1809, where a process for judging the operation environment is executed.

First, in Step S1810, the operation environment is judged, the priority is determined, and the result is recorded (this environmental environment judgment shall be described later using FIGS. 19A and 19B). In Step S1811, the environmental judgment result is obtained, and here it is assumed that a result indicating that operations are being carried out using an integrated server is obtained. Then, in Step S1812, it is determined whether or not information of another environment is necessary.

Here, if information of another environment is necessary, the process moves to Step S1813, where a process for acquiring the information of another environment is executed. In Step S1814, another computer name is acquired, and in Step S1815, the fact that the other environment information acquisition has been completed is registered. Then, in Step S1816, if printing is underway, the information of the other environment is recorded in the self registry (if a record exists and there is no update, there is no need to rewrite the record).

Next, in Step S1817, the acquired variable information is set. In Step S1818, the information to be set in the master table is selected from the acquired information within the list and the control record, and is written in parallel (this result determination shall be described later using FIG. 20). In Step S1819, the compound information type variable information, such as the computer name, is set in the master table.

(Environment Determination Flow)

Figure 18A:
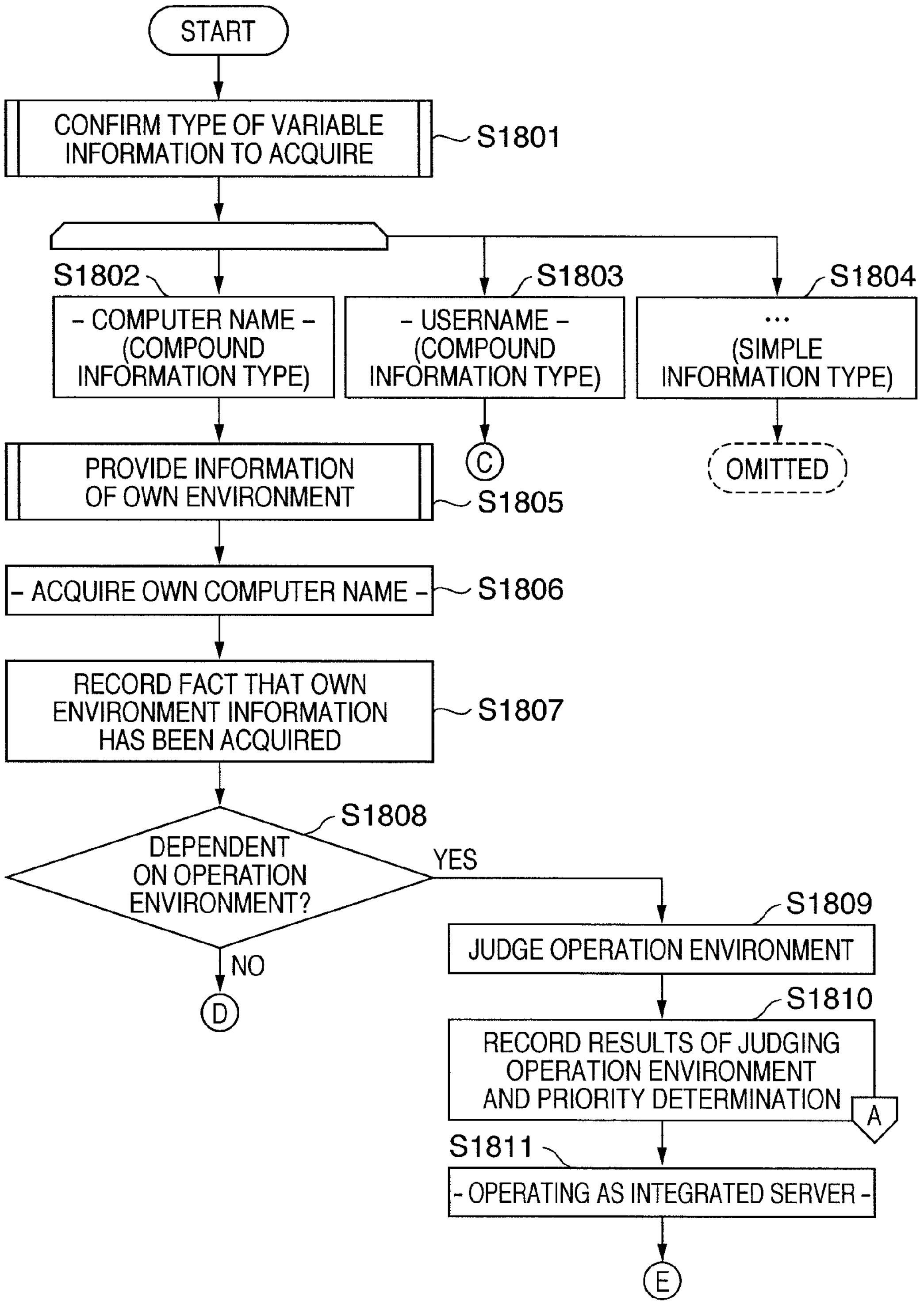
FIGS. 18A and 18B are flowcharts illustrating a basic flow according to an embodiment of the present invention.
Figure 19A:
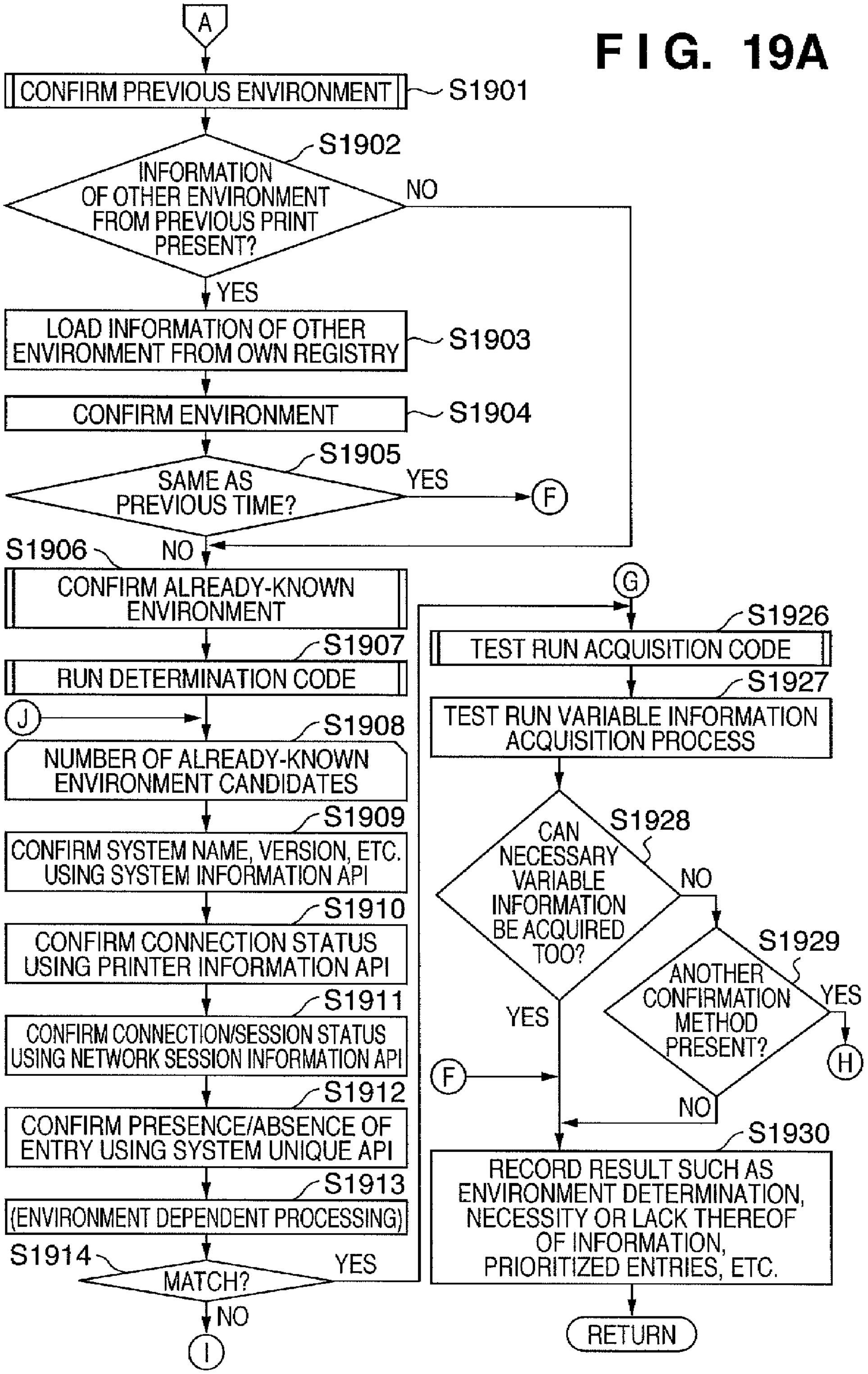
FIGS. 19A and 19B are flowcharts illustrating details of environment determination carried out in S1810 of FIG. 18A.
Figure 19B:
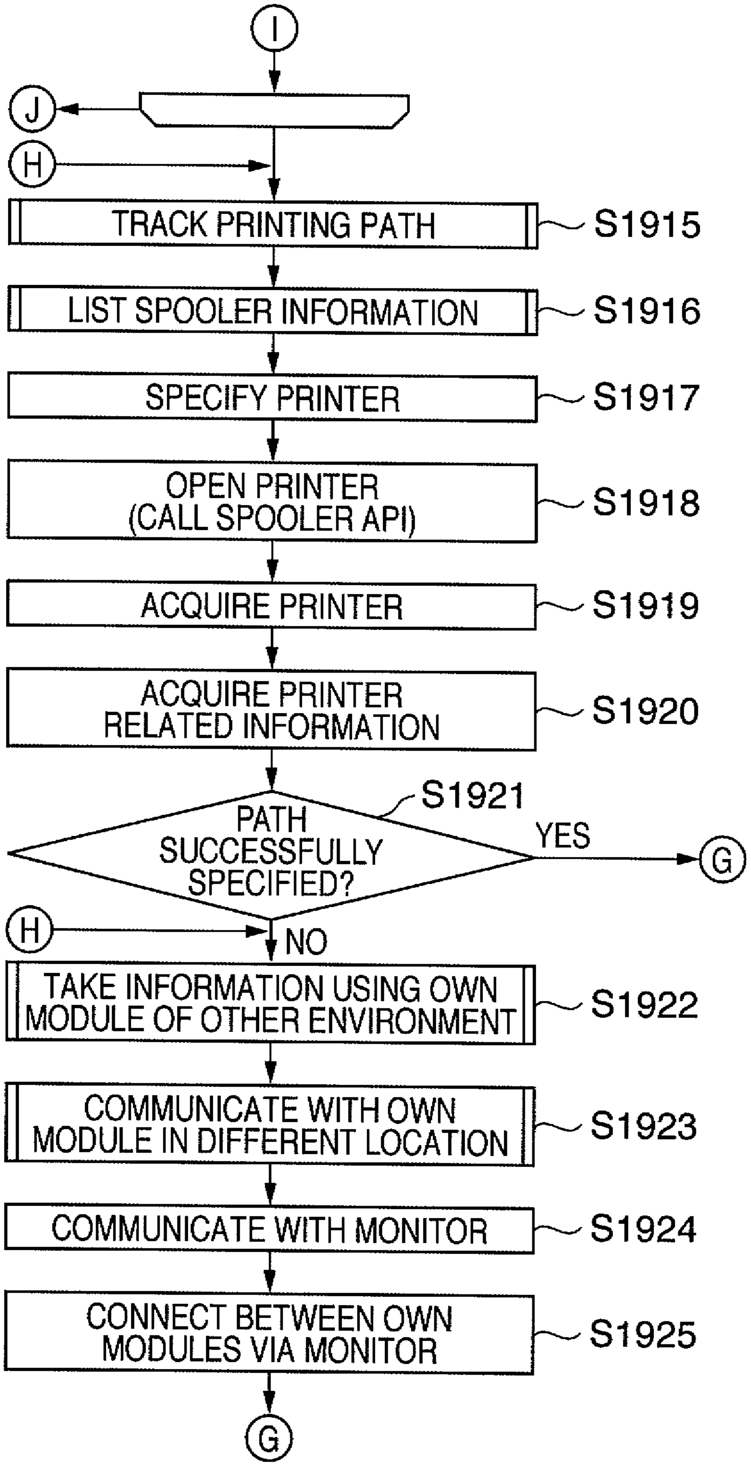

Next, the details of the environment determination carried out in S1810 of FIG. 18A shall be described using FIGS. 19A and 19B. Note that this environment determination is carried out through a method that compares the current environment with the environment of a previous print, confirms an already-existing environment, tracks the printing path, and acquires information using the self module in another environment.

In step S1901, a previous environment is confirmed. In Step S1902, it is confirmed whether or not there is information of another environment at the time of a previous print. This information is information that has been recorded into the self registry in Step S1816.

Here, if there is information of another environment at the time of a previous print, the process moves to Step S1903, where the self registry is loaded; in Step S1904, the environment is confirmed. Next, in Step S1905, it is determined whether the present environment is the same as a previous environment. If the environment is the same, the process moves to Step S1930, where control information is recorded in the same manner as the previous time.

On the other hand, if the environment is different from the previous environment, the process moves to Step S1906, where an already-known environment is confirmed. In Step S1907, a determination code of the environment determination section is run. With the processing starting with Step S1908, the already-known environments included in the determination code are determined. In Step S1909, the name and version of the system are confirmed using a system information API. In Step S1910, the connection status is confirmed using a printer information API. In Step S1911, the connection session is confirmed using a network session information API. In Step S1912, the presence/absence of a system-unique API entry is confirmed. This unique API entry indicates an API that is unique to a specific environment and is easily distinguishable from others. In Step S1913, a process dependent on the installation location of the system is confirmed. Then, in Step S1914, it is determined whether the information collected through the abovementioned steps matches with an already-present environment.

If the information matches, the process moves to Step S1926, where an acquisition code of the information acquisition section is test run. Next, in Step S1927, a variable information acquisition process is test run. A test run is executed rather than the actual acquisition operation because the configurations and procedures of the environment determination section and the information acquisition section are independent from one another. If the environment determination section and the information acquisition section are identical, the actual acquisition of information may be carried out.

In addition, if the acquisition of the necessary variable information is also possible in Step S1928, where the test result is determined, the process moves to Step S1930, where the result, such as the environment determination, necessity or lack thereof of information, entries to be given priority, and so on is recorded. However, if the acquisition of the necessary variable information is not possible in Step S1928, the process moves to Step S1929, where it is determined whether or not there is another confirmation method.

Here, if there is another confirmation method, the process moves to Step S1915, where a process for tracking the printing path is executed; in Step S1916, the spooler information is listed up. Then, in Step S1917, a printer is specified, and in Step S1918, a spooler API for opening the specified printer is called. Once the printer has been opened, printer information is acquired in Step S1919, and in Step S1920, printer-related information is acquired. If the path can be specified based on the acquired information in Step S1921, the process moves to Step S1926. If the path cannot be specified, the process moves to Step S1922.

Starting with Step S1922, a process for acquiring information using the self module of another environment is executed. In Step S1923, communication is carried out with a self module in another location. In Step S1924, communication is carried out with a monitor, and in Step S1925, the self modules are connected to one another via the monitor. For example, assuming the connection was made from the server side to the client side, even if the server side is making the connection from another environment, that environment is considered by the client side to be its own environment, and thus that information is acquired.

Then, in Step S1930, the result, such as the environment determination, necessity or lack thereof of information, entries to be given priority, and so on is recorded.

(Result Selection Flow)

Figure 18B:
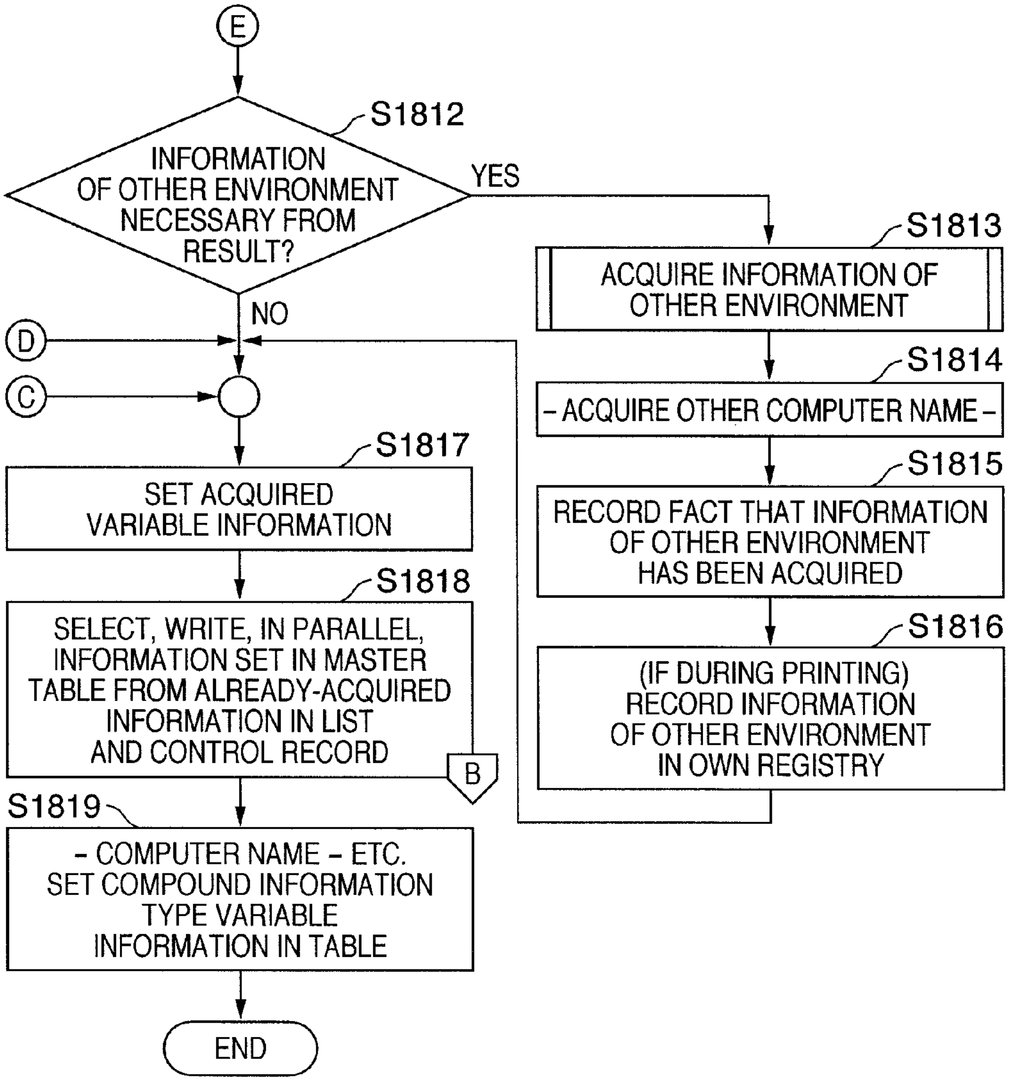
Figure 20:
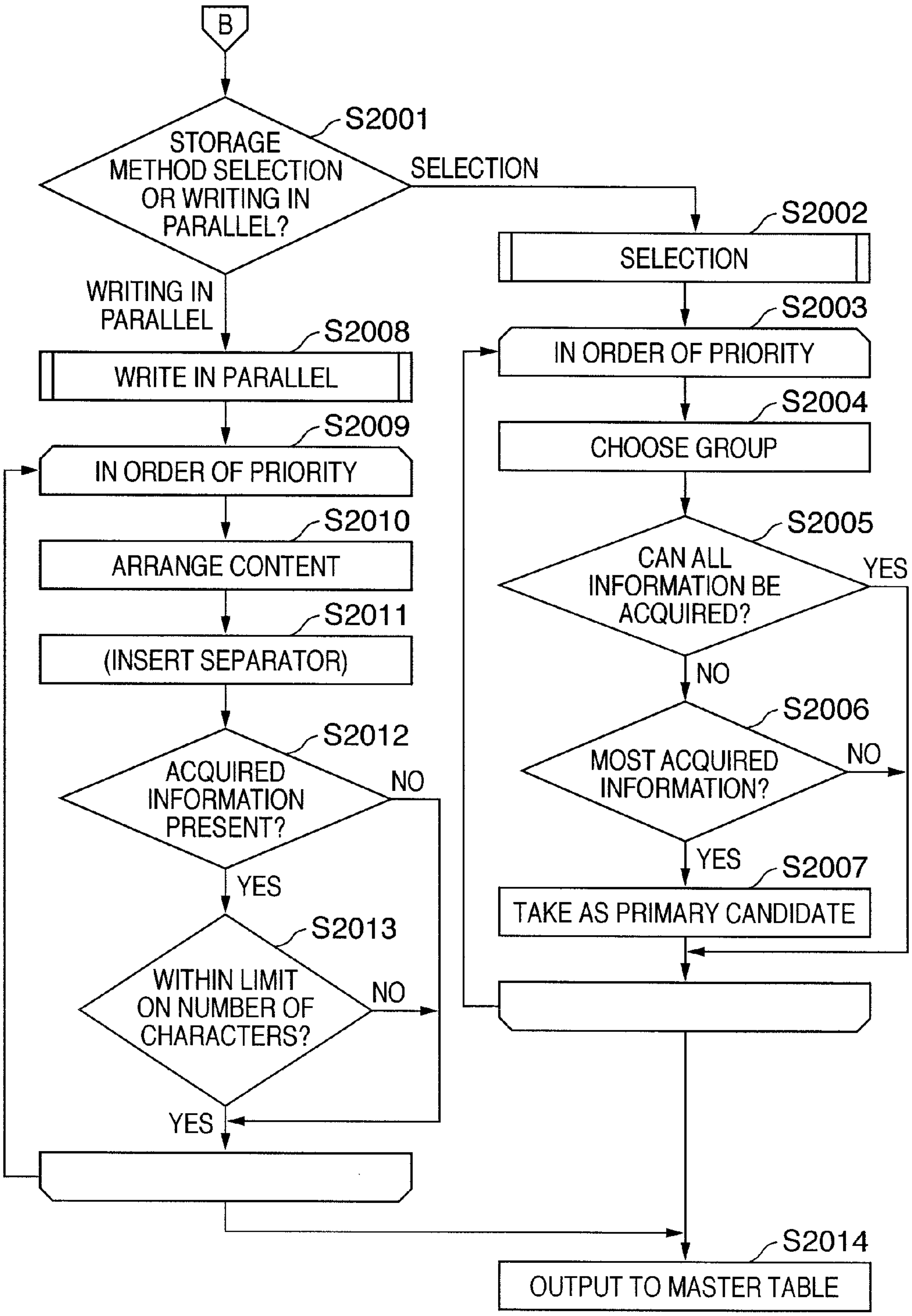
FIG. 20 is a flowchart illustrating details of result selection carried out in S1818 of FIG. 18B.

Next, the details of the result selection carried out in S1818 of FIG. 18B shall be described using FIG. 20. However, before describing this, descriptions shall first be given regarding the standard for storage used when causing the details of the acquired compound information type variable information in the master table.

The compound information type variable information is treated as a group so that the relationship between members of the variable information is maintained, and is controlled so that the amount of information that cannot be acquired is kept low. The information is basically selected on a group-by-group basis. The order of the standards is as follows.

1) Priority is high

2) All information successfully acquired

3) High amount of information successfully acquired

Note that whether or not all information was successfully acquired is important at the time of selection. Furthermore, when information is written in parallel rather than being selected, the information may be arranged in order by priority.

Now, the result selection flow shall be described. In Step S2001, the method for storage into the master table is confirmed. If the method is selection, the process moves to Step S2002. A loop starts in Step S2003; a group is selected in order of priority in Step S2004, and if all information within the group has been acquired in Step S2005, the process exits the loop. Alternatively, in Steps S2006 and S2007, the highest-priority group with the most acquired information is selected. The content thereof is stored in the master table in Step S2014.

On the other hand, in Step S2001, if the method is writing in parallel, the process moves to Step S2008. A loop starts in Step S2009, where the information content is arranged in order of priority in Step S2010. In Step S2011, a separator is inserted as necessary. Then, in Steps S2012 and S2013, the acquired information is written in parallel, until the number of characters reaches the character number limit. The content thereof is stored in the master table in Step S2014.

(Result Selection Example)

Figure 21:
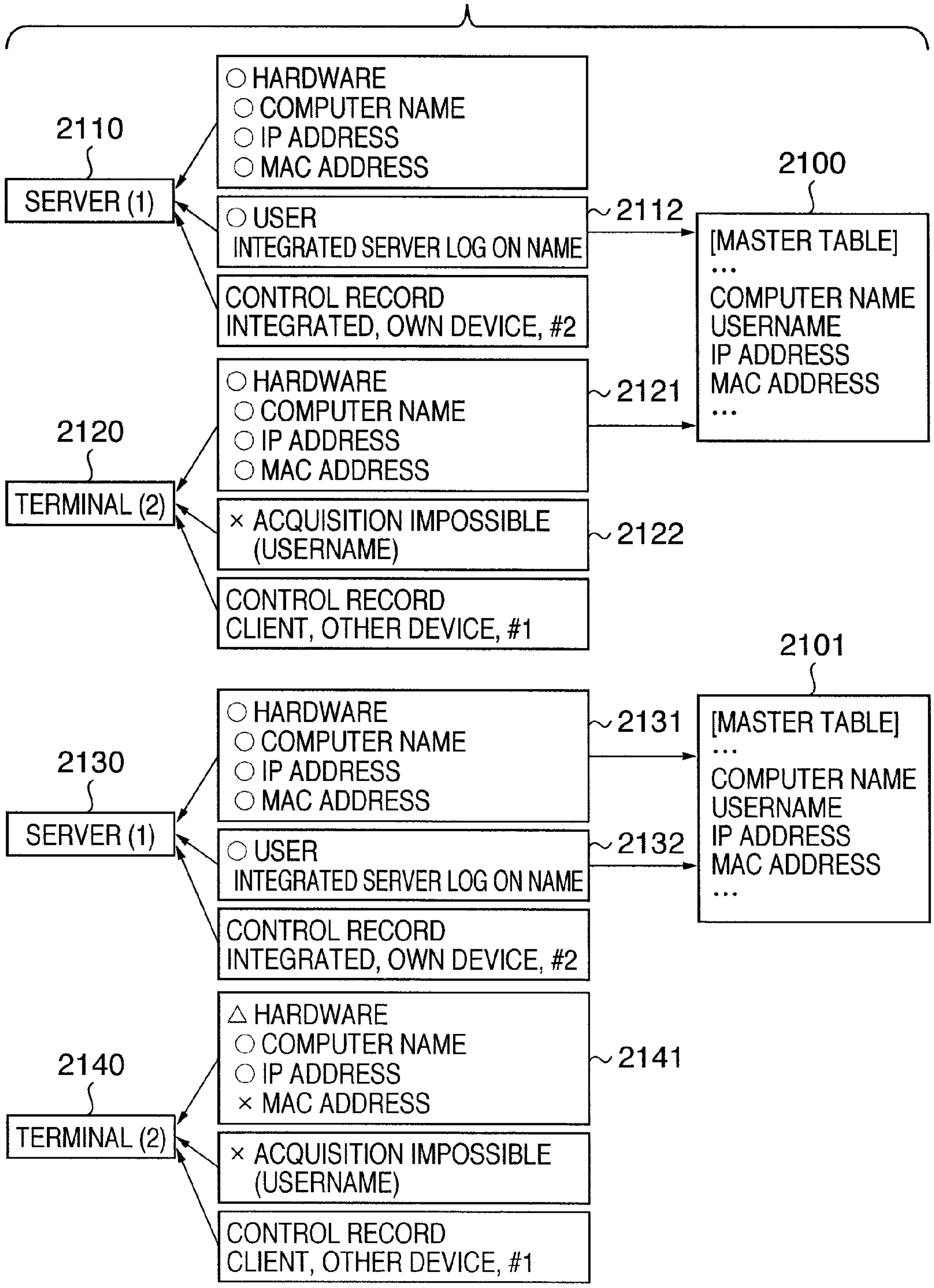
FIG. 21 is a diagram illustrating a specific example of result selection.

Next, a specific example of the above-mentioned result selection shall be described using FIG. 21. FIG. 21 is a diagram illustrating a specific example of result selection. In FIG. 21, 2110 and 2120 represent acquired compound information type variable information. The information of a terminal 2120 is high in the order of priority, and because the variable information of a hardware group 2121 of the terminal 2120 has been acquired, it is reflected in a master table 2100. However, the variable information of a user group 2122 of the terminal 2120 has not been acquired. In this case, a user group 2112 of the server 2110, which is next in the order, is confirmed. Here, the variable information of the user group 2112 has been acquired, and therefore this is reflected in the master table 2100.

Moreover, in the case where the compound information type variable information has been acquired as indicated by 2130 and 2140 in FIG. 21, it is reflected in a master table 2101 in the following manner. The information of a terminal 2140 is high in the order of priority, and the variable information "MAC address" of a hardware group 2141 of the terminal 2140 has not been acquired. In this case, a hardware group 2131 of the server 2130, which is next in the order, is confirmed. All of the variable information of the hardware group 2131 has been acquired, and therefore this is reflected in the master table 2101. Note that a user group 2132 is handled in the same manner as described above, and thus descriptions thereof shall be omitted.

(Layout Application Example)

In an integrated server environment, if, for example, "terminal name+server name" is taken as the computer name, writing this in parallel lengthens the character string. However, by performing the following layout control using a program, it is possible to maintain the printing results without burdening the user.

Figure 22:
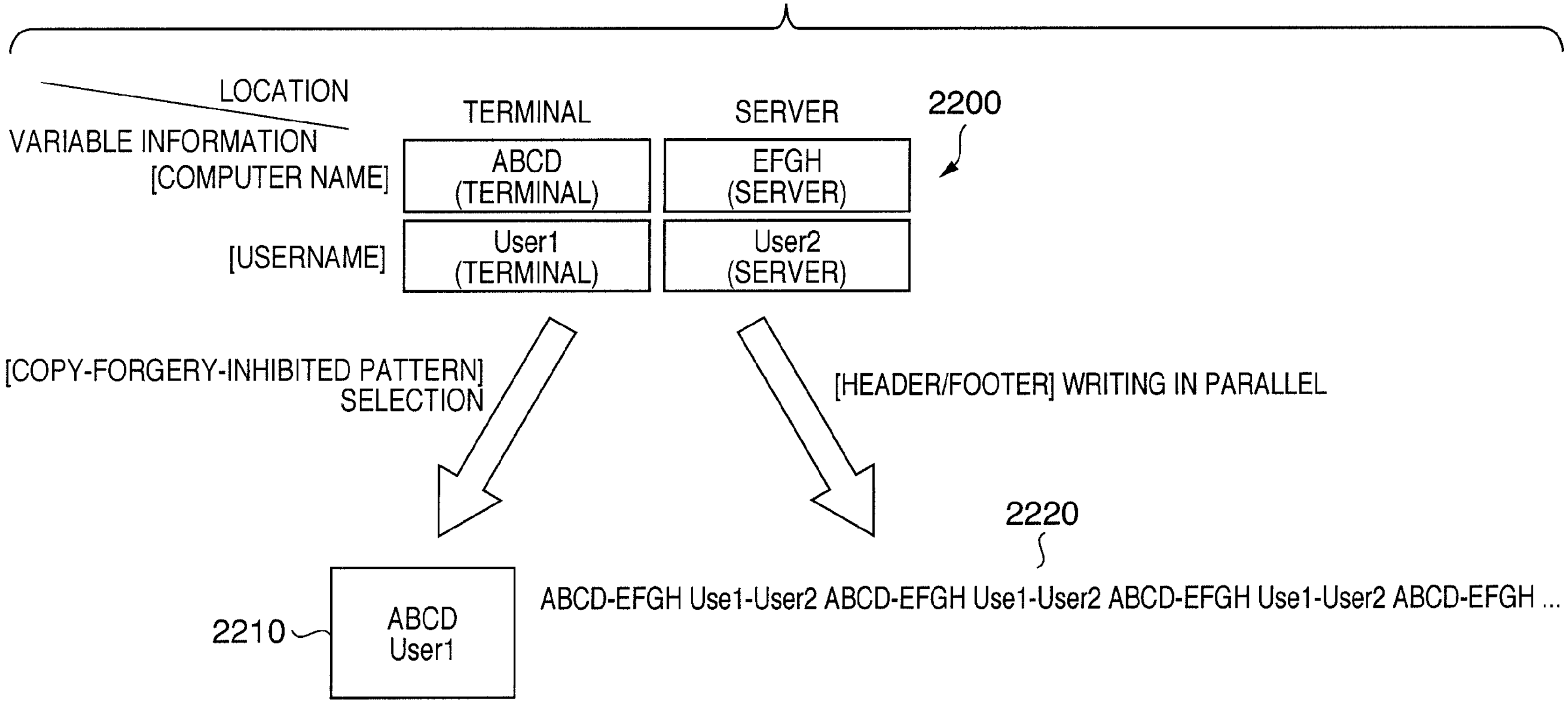
FIG. 22 is a diagram illustrating an example of layout application according to an embodiment of the present invention.

—Switch Between Selection and Writing in Parallel in Tandem with a Certain Function A case where selection is used for the copy-forgery-inhibited pattern and writing in parallel is used for header/footer printing shall be described using FIG. 22. Here, it is assumed that compound information type variable information as indicated by 2200 is acquired. When printing a copy-forgery-inhibited pattern 2210, the variable information is selected. Meanwhile, when printing a header/footer 2220, the variable information is written in parallel.

This switching control is control that takes into consideration the gap between the characteristics of certain functions. While the copy-forgery-inhibited pattern has the characteristics of using a large font and a short character string to achieve the visualization effects, headers/footers are normally written as superscript using a small font and thus easily handle long character strings.

—Using Unset Lines

Figure 23:
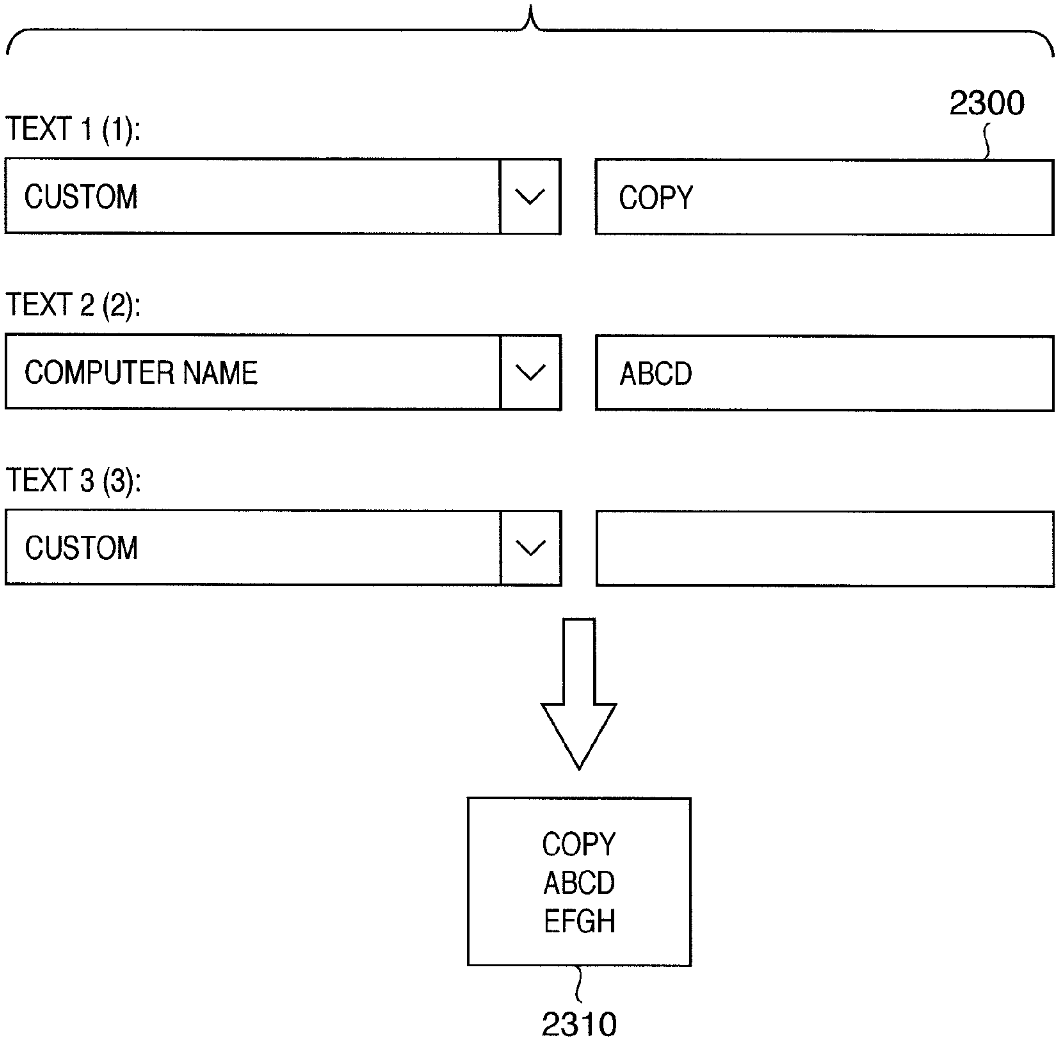
FIG. 23 is a diagram illustrating another example of layout application according to an embodiment of the present invention.

A case of writing in parallel across lines shall be described using FIG. 23. In the case where a user has not exceeded the limit on the number of lines (with the set number being the maximum) with the variable information, as indicated by 2300 in FIG. 23, the content to be written in parallel is set also using the blank line (unset region) so as to realize the details written as indicated by 2310.

In this manner, variable information with simple content can be distinguished from variable information with compound content, and the presence/absence of this distinction, and the range to which it can be applied, can be switched.

The extension and control of the variable information as described thus far improves the identifiability of the printing conditions, and reduces the work required for making settings regarding the usage environment, for the user. Furthermore, the adaptability of a product to its environment can be improved, and the printing results can also be maintained.

It goes without saying that the extension and control of variable information as described thus far can be applied not only to the ground pattern but also to processes for acquiring, displaying, and recording print information. Furthermore, the extension and control of variable information can also be applied to cases where the information is embedded in two-dimensional code and retained as a log.

Note that the present invention may be applied to a system comprising a plurality of devices (for example, a host computer, an interface device, a reader, a printer, and so on), or may be applied to an apparatus comprising a single device (for example, a copy machine, a facsimile device, and so on).

Furthermore, it goes without saying that the object of the present invention can also be achieved by supplying, to a system or apparatus, a storage medium in which the program code for software that realizes the functions of the aforementioned embodiment has been stored, and causing a computer (CPU or MPU) of the system or apparatus to read out and execute the program code stored in the storage medium.

In such a case, the program code itself read out from the computer-readable storage medium implements the functionality of the aforementioned embodiment, and the storage medium in which the program code is stored composes the present invention.

Examples of a storage medium for supplying the program code include a flexible disk, a hard disk, an optical disk, a magneto-optical disk, a CD-ROM, a CD-R, magnetic tape, a non-volatile memory card, a ROM, and so on.

Moreover, it goes without saying that the following case also falls under the scope of the present invention, which is not limited to implementing the functions of the aforementioned embodiment by a computer executing the read-out program code. That is, the case where an operating system (OS) or the like running in a computer performs part or all of the actual processing based on instructions in the program code, and the functionality of the aforementioned embodiment is realized by that processing, is included in the scope of the present invention.

Furthermore, the program code read out from the storage medium may be written into a memory provided in a function expansion board installed in the computer or a function expansion unit connected to the computer. Then, a CPU or the like included in the function expansion board or expansion unit performs all or part of the actual processing based on instructions included in the program code, and the functions of the aforementioned embodiment may be implemented through that processing. It goes without saying that this also falls within the scope of the present invention.

According to the present invention, the identifiability of the printing conditions can be improved, and the work required for making settings for the usage environment can be reduced. Moreover, the adaptability of a product to its environment can be improved, and the printing results can also be maintained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-096597, filed Apr. 2, 2007, which is hereby incorporated by reference herein in its entirety.

What is claimed is:

1. An information processing server comprising:

an acquisition unit that acquires variable information from a client apparatus, and variable information from said information processing server;

a master table definition unit that registers, based on the variable information acquired from said client apparatus and said information processing server, a latent image character string, which is to be used a latent image in a copy-forgery-inhibited pattern, to a master table; and a generation unit that accepts a designation of variable information via a copy-forgery- inhibited pattern setting screen, acquires a latent image character string corresponding to the designated variable information from the master table, and generates print data comprising a copy-forgery-inhibited pattern having the acquired latent image character string as a latent image, wherein the master table definition unit registers the variable information acquired from said client apparatus with a higher priority than the variable information acquired from said information processing server to the master table, and registers, if the variable information is not acquired from said client apparatus, the variable information acquired from said information processing server to the master table.

2. The information processing server according to claim 1, wherein:

the variable information comprises hardware information including at least a computer name, and user information including at least a user name, and the master table definition unit registers the hardware information acquired from said client apparatus with a higher priority than the hardware information acquired from said information processing server to the master table, and registers, if the user information is not acquired from said client apparatus, the user information acquired from said information processing server to the master table.

3. The information processing server according to claim 1, wherein the variable information is registered in the master table in accordance with an order of (i) priority is high, (ii) all information successfully acquired, and (iii) high amount of information successfully acquired.

4. An information processing method executable by an information processing server, the method comprising the steps of:

acquiring variable information from a client apparatus, and variable information from the information processing server;

registering, based on the variable information acquired from the client apparatus and the information processing server, a latent image character string, which is to be used a latent image in a copy-forgery-inhibited pattern, to a master table;

accepting a designation of variable information via a copy-forgery-inhibited pattern setting screen;

acquiring a latent image character string corresponding to the designated variable information from the master table; and generating print data comprising a copy-forgery-inhibited pattern having the acquired latent image character string as a latent image, wherein the registering step registers the variable information acquired from the client apparatus with a higher priority than the variable information acquired from the information processing server to the master table, and registers, if the variable information is not acquired from the client apparatus, the variable information acquired from the information processing server to the master table.

5. The method according to claim 4, wherein:

the variable information comprises hardware information including at least a computer name, and user information including at least a user name, and the registering step registers the hardware information acquired from the client apparatus with a higher priority than the hardware information acquired from the information processing server to the master table, and registers, if the user information is not acquired from the client apparatus, the user information acquired from the information processing server to the master table.

6. The method according to claim 4, wherein the variable information is registered in the master table in accordance with an order of (i) priority is high, (ii) all information successfully acquired, and (iii) high amount of information successfully acquired.

7. A non-transitory computer-readable storage medium storing a program executable by a processor of an information processing server to execute the information processing method comprising the steps of:

acquiring variable information from a client apparatus and variable information from the information processing server;

registering, based on the variable information acquired from the client apparatus and the information processing server, a latent image character string, which is to be used a latent image in a copy-forgery-inhibited pattern, to a master table;

accepting a designation of variable information via a copy-forgery-inhibited pattern setting screen;

acquiring a latent image character string corresponding to the designated variable information from the master table; and generating print data comprising a copy-forgery-inhibited pattern having the acquired latent image character string as a latent image, wherein the registering step registers the variable information acquired from the client apparatus with a higher priority than the variable information acquired from the information processing server to the master table, and registers, if the variable information is not acquired from the client apparatus, the variable information acquired from the information processing server to the master table.

8. The medium according to claim 7, wherein:

the variable information comprises hardware information including at least a computer name, and user information including at least a user name, and the registering step registers the hardware information acquired from the client apparatus with a higher priority than the hardware information acquired from the information processing server to the master table, and registers, if the user information is not acquired from the client apparatus, the user information acquired from the information processing server to the master table.

9. The medium according to claim 7, wherein the variable information is registered in the master table in accordance with an order of (i) priority is high, (ii) all information successfully acquired, and (iii) high amount of information successfully acquired.

* * * * *